United States Patent [19]

Ohtsuka et al.

[11] Patent Number: 4,943,994
[45] Date of Patent: Jul. 24, 1990

[54] STILL PICTURE PICTUREPHONE COMMUNICATIONS SYSTEM

[75] Inventors: Hiroshi Ohtsuka; Yutaka Ueno, both of Kanagawa, Japan, Lawrence D. Emmons; James S. Mackley, both of Grass Valley City, Calif.

[73] Assignees: Luma Telecom Incorporated, Santa Clara, Calif.; Mitsubishi Denki Kabushiki Kaisha, Tokyo, Japan

[21] Appl. No.: 263,892

[22] Filed: Oct. 28, 1988

[30] Foreign Application Priority Data

Oct. 30, 1987 [JP] Japan ................................ 62-274819
Oct. 30, 1987 [JP] Japan ................................ 62-274820
Oct. 30, 1987 [JP] Japan ................................ 62-274821
Oct. 30, 1987 [JP] Japan ................................ 62-274822
Nov. 6, 1987 [JP] Japan ................................ 62-280542

[51] Int. Cl.⁵ .............................................. H04N 7/14
[52] U.S. Cl. ...................................... 379/53; 358/85
[58] Field of Search ............... 379/53, 54, 96, 100; 358/85, 134, 257, 435, 436, 438

[56] References Cited

U.S. PATENT DOCUMENTS 3,914,538 10/1975 Perreault et al. .................... 358/257
4,321,626 3/1982 Wada .................................. 379/100
4,485,400 11/1984 Lemelson et al. ................. 358/85 X
4,715,059 12/1987 Cooper-Hart et al. ............... 379/53
4,734,780 3/1988 Iwata et al. ........................ 358/257
4,825,457 4/1989 Lebowitz .............................. 379/40

FOREIGN PATENT DOCUMENTS 2173675 10/1986 United Kingdom .................. 379/53

OTHER PUBLICATIONS

Teleconference, vol. 6, No. 6, 1988, pp. 20–27, "New Products and Services for 1988".
William J. Hawkins, "For-Your-Home Video Phones", Popular Science, Mar. 1988, pp. 60–62 & 107.
Robot Research, Inc., "Robot RVS3000RX Phoneline Video Receiver", Installation & Operation Manual, Feb. 1987, Rev. B.

Primary Examiner—Keith E. George
Attorney, Agent, or Firm—Bernard, Rothwell & Brown

[57] ABSTRACT

A still picture picturephone communication system for transmitting and receiving a still picture over a telephone circuit including a handshaking process wherein prior to still picture transmission, identification code data indicating a function of the picturephone set is transmitted and received, and a decision is made as to whether the still picture is being transmitted or not. A designation code of a desired response waiting time within an identification code data used at the time of handshaking is formed, and the response is delayed by a period of time corresponding to the response waiting time. A still picture data is directly transmitted and received without handshaking. In addition character data including character information and the like can be transmitted and received, and by manipulating the picturephone set of one party the picturephone set of the other party can be made to transmit picture data therefrom. Furthermore, the picture sent from the called party can be transferred to a third party.

8 Claims, 23 Drawing Sheets

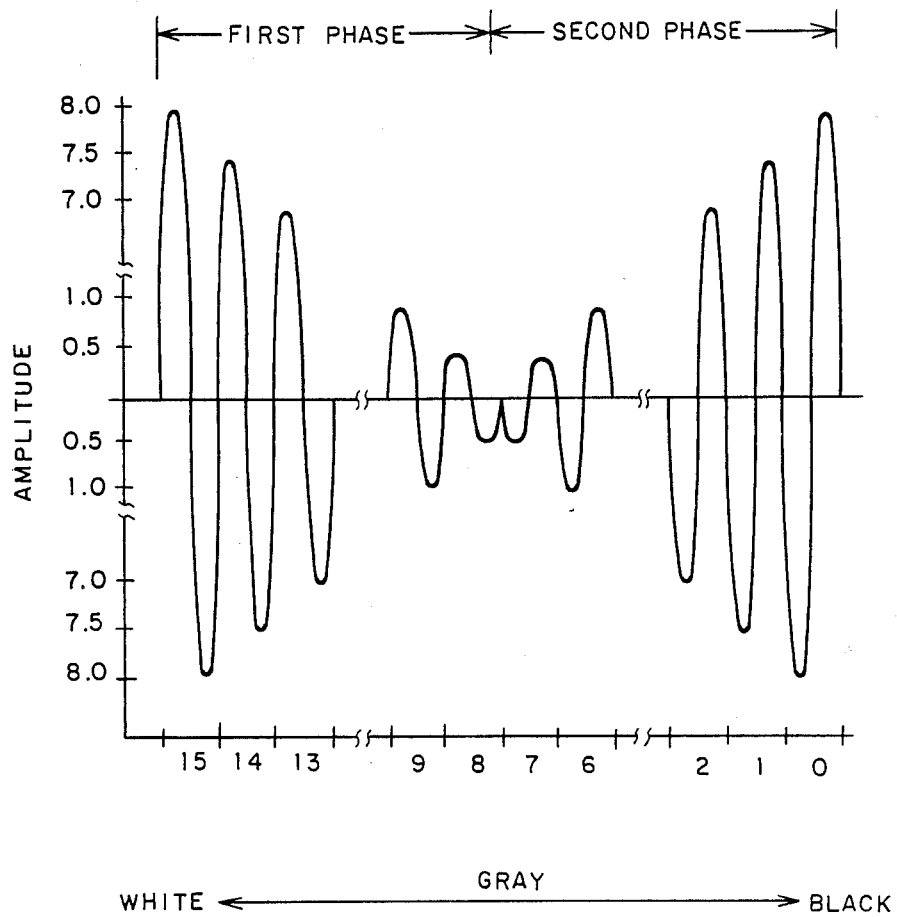

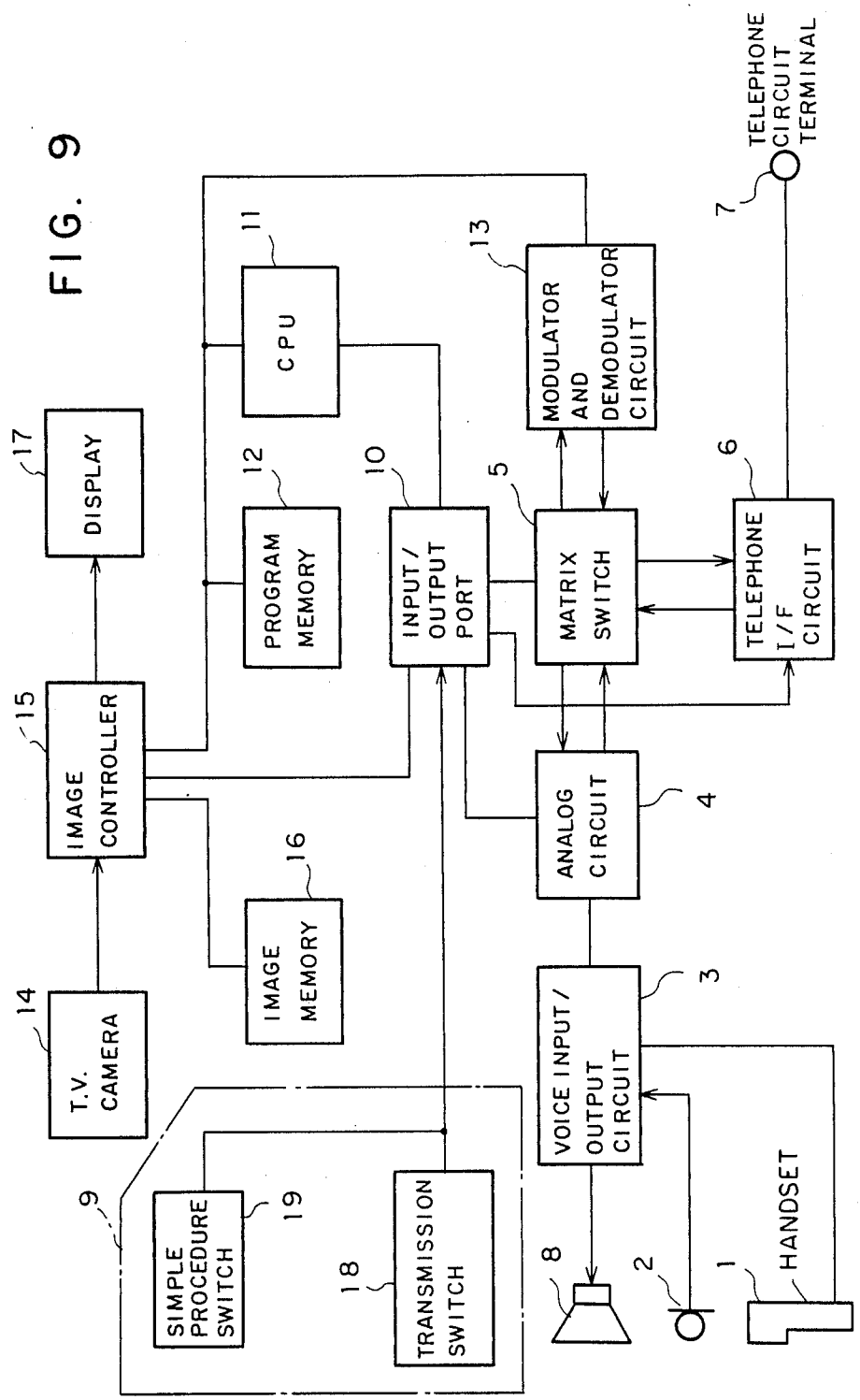

BIT "1"

3 CYCLES, FIRST PHASE
AMPLITUDE (MAX)

BIT "0"

3 CYCLES, SECOND PHASE
AMPLITUDE (MAX)

STILL PICTURE PICTUREPHONE COMMUNICATIONS SYSTEM

BACKGROUND OF THE INVENTION

1. Field of the Invention

The present invention relates to a still picture picturephone communication system, and in particular, to an improvement in a still picture picturephone transmission system wherein a picture signal of a still picture obtained by picking up with a camera is modulated to a voice band signal and sent out to a telephone circuit, and wherein a picture signal supplied through the telephone circuit is demodulated to be visualized on a display.

2. Description of the Prior Art

A picturephone which sends voice and picture simultaneously by using a telephone communication circuit has been considered desirable. Practically, however, it is difficult to continuously transmit and receive a dynamic picture which requires a great amount of data through telephone communication circuits presently used. Thus, a still picture picturephone for transmitting a still picture to the called party during talking is used instead.

In this still picture picturephone, it is possible, during talking with normal voice, to send a desired still picture, for example, a face of the talking person, a photographic picture plane or drawings corresponding to the contents of the talking arbitrarily by interrupting the talking temporarily.

Accordingly, the advantage has been provided in the still picture picturephone mentioned above in that a picture can be sent and received over a telephone circuit which was impossible heretofore, and that since only one still picture is sent each time when required, the amount of data processing is limited, thereby to make it easy to put the picturephone to practical use.

Hereinafter, a still picture picturephone set using a prior art still picture picturephone communication system will be described with reference to the drawings.

FIG. 1 shows a circuit diagram of a still picture picturephone set disclosed, for example, in "Foreign Communications Technique", the October number, 1986.

In the Figure, reference numeral 1 designates a handset, 2 a microphone, 3 a voice input/output circuit, 4 an analog circuit, 5 a matrix switch, 6 a telephone interface circuit, 7 a telephone circuit connection terminal, 8 a speaker, 9 a key pad, 10 an input/output port, 11 a CPU, 12 a program memory, 13 a modulator and demodulator (MODEM) circuit, 14 a TV camera, 15 an image controller, 16 an image memory, and 17 a display. On the other hand, FIG. 2 shows a sequence diagram of a picture transmission procedure for the above picturephone set.

Next, the operation for the transmission of voice and a picture signal in the prior art picturephone set will be described with reference to FIGS. 1 and 2. In FIG. 1, a call with voice is sent to the telephone circuit connection terminal 7 from the handset 1 or microphone 2 through the voice input/output circuit 3, analog circuit 4, matrix circuit 5, and telephone interface circuit 6. Further, a voice signal from the called party is transferred to the handset 1 or speaker 8 through a reverse route of the above-mentioned signal route, and it is reproduced by the handset 1 or speaker 8.

On the other hand, in transmitting the picture signal, as shown in FIG. 2, handshaking is carried out and then the still picture transmission is performed.

Specifically, in order to ascertain whether the picturephone set of the called party is of the same type, header frame comprising an identification code data (hereinafter referred to as ID code) indicating the capability of equipment is sent out, and after the sent back ID code from the called party is ascertained, the picture data is transmitted. The header frame comprises frame synchronizing data for synchronization, preamble data and signal for auto gain control and amplitude regulation and each is set before ID code (not shown).

Here, in FIG. 3(a), the components of the header frame are shown, and in FIG. 3(c), an ID code at the time of picture data transmission is shown.

As shown in FIG. 3(b), the ID code at the time of handshaking consists of 0 data of the first 8 bits, machine data (M) indicating the function of the picturephone set, frame classification data (F) indicating the frame classification such as the number of pixels in a frame to be transmitted, ID extension code data indicating the continuation of ID codes, and frame check sequence data (FCS). Furthermore, in the ID code at the time of picture data transmission, as shown in FIG. 3(c), length data (L) indicating data quantity per one line is formed in the first 8 bits, and frame classification data (F) indicates a frame classification of picture data to be transmitted actually to achieve matching of functions of both equipments which perform transmission and reception respectively. The data arrangement within both ID codes is identical.

Thus, in FIG. 1, when the sending out of a picture is instructed by the key pad 9, the CPU 11 detects this through the input/output port 10, and ID code is sent out to the modulator and demodulator (MODEM) 13 in accordance with a program stored beforehand in the program memory 12. After this ID code is modulated to an analog signal, it is sent out through the matrix switch 5 from the telephone circuit connection terminal 7.

The ID code from the called party is transferred to the CPU 11 through a reverse route of the above signal route, and the CPU 11 ascertains the ID code. During this time period, the image picked up by the TV camera 14 is quantized in the image controller 15 and stored in the image memory 16. The stored data is sequentially led out and displayed on the display 17, and it is also outputted to the telephone circuit connection terminal 7 from the image memory 16 according to a command of the CPU 11.

Furthermore, when an ID code or image data is inputted from the called party, the matrix switch 5 changes over the destination of a received signal through the telephone interface circuit 6 in accordance with a received carrier signal such that the analog circuit 4 is changed to the modulator and demodulator circuit 13.

After the received signal has been demodulated in the modulator and demodulator circuit 13, the CPU 11 returns or stores the ID code in the image memory 16, and the image controller 15 sequentially picks up the image data of the calling party and the image data of the called party for display on the display 17.

When the transmission and reception of the picture have been finished and no carrier signal is supplied from the modulator and demodulator circuit 13, the matrix switch 5 connects the telephone interface circuit 6 to the analog circuit 4 thereby to restore the talking with voice.

In the prior art, as shown in FIG. 2, the response to the ID code, or the sending out of the picture data was carried out after waiting one second from the reception of the ID code of the other party.

Specifically, in the prior art picturephone set, it is arranged to perform the matching of impedance between the circuit and the picturephone set when the picture send-out instruction is inputted. As a result, in order to achieve the data reception correctly, one second is necessary as a response waiting time, and the response was delayed one second automatically In the prior art still picture picturephone communication system, since it is arranged as described above, the problem is that one second of waiting time is not necessary when the transmission is carried out to equipment with which no impedance matching is required.

Furthermore, in the prior art communication system, in order to ascertain whether the picturephone telephone sets at both ends are of the same system classification, as described above, a header including an ID code is sent out by handshaking. Furthermore, at the receiving party, the ID code sent thereto is ascertained, and then an ID code indicating the system classification of the receiving end is sent back. In this case, the above-mentioned system classification indicates, for example, the capability of the telephone sets of the sending and receiving parties, that is, the size of the screens (picture planes) in terms of a number of pixels at the sending and receiving ends, and the screens are classified into a number of classifications including 48×48, 64×64, 96×96, 128×128 pixels, etc.

Accordingly, when the pixel numbers differ from each other at the sending and receiving ends, a situation will be encountered in which still picture data obtained by complex operations can not be sent to the receiving party. Thus, in the prior art system, before sending and receiving picture data, it has been necessary to perform the handshaking by sending out and actually sending back the headers including the ID codes.

Consequently, the prior art system involves the drawback in that a considerable time is required for the handshaking, and the interruption time of the talking becomes long.

On the other hand, the picture data in the prior art example mentioned above is modulated to a picture signal in the following manner. In other words, in the example shown in FIG. 4, the modulated signal is made of phases, including first phase of a sine curve type and a second phase of an inverse sine curve type which are out of phase by 180 degrees, and each phase is formed with a plurality of signals of different amplitudes. These one-cycle signals of particular phases and particular amplitudes are made to correspond to particular colors. In this example, each phase includes eight cycles, and thus, a total of sixteen cycles are included in the two phases. A signal "15" having the maximum amplitude in the first phase corresponds to white, a signal "0" having the maximum amplitude in the second phase corresponds to black. Intermediate signals "14"~"1" correspond respectively to gray of different lightness.

In such a prior art still picture picturephone communication system, it is possible to perform talking with voice, and the transmission and reception of a still picture at a suitable timing. However, the function for transmitting and receiving character data including character information and the like has not been provided. As a result, there has been a problem in that in order to transmit and receive the character data, a separate, independent and large apparatus is necessary.

Furthermore, in the prior art still picture picturephone mentioned above, the images picked up by the built-in cameras of the respective parties are merely sent and received in accordance with transmission commands by both parties. As a result, there is a problem that when a talking person is absent, it is impossible to transmit the picture data.

Moreover, in the prior art still picture picturephone mentioned above, it is possible to demodulate the picture data sent from the other party in communication and to display the same on a display. The picture data sent from the other party is stored in an image memory. However, it has been impossible to transfer the picture data stored in the image memory to a third party.

SUMMARY OF THE INVENTION

It is the first object of the invention to obtain a still picture picturephone communication system capable of delaying a response by a period of time corresponding to a received response waiting time by forming a designation code of a desired response waiting time within an ID code used at the time of handshaking.

It is the second object of the invention to obtain an improved still picture picturephone communication system capable of decreasing the communication time for still picture data, that is, decreasing the interruption time of the talking.

It is the third object of the invention to obtain a still picture picturephone communication system capable of transmitting and receiving bit data including character information and the like very effectively with addition of a simple arrangement, by utilizing the function of still picture data transmission and reception.

It is the fourth object of the invention to obtain a still picture picturephone communication system capable of making a picturephone set of the other party transmit picture data therefrom by manipulating a picturephone set of one party.

It is the fifth object of the invention to obtain a picture picturephone communication system in which a picture of a calling party is displayed in a mirrored condition reversed with respect to right and left of the picture, whereas a picture from a called party is displayed as it is in a non-mirrored condition, and the picture sent from the called party can be transferred to a third party.

In order to achieve the above first object, a still picture picturephone communication system according to the present invention is characterized in that a designation code of a desired response waiting time is formed within an ID code used at the time of handshaking, and a response of sending out of an ID code or sending out of picture data is delayed by a period of time corresponding to a response waiting time of a received ID code.

Accordingly, in the still picture picturephone communication system according to the present invention, it is possible to eliminate the unnecessary waiting time in the prior art, and on the other hand, the sending out of a response to the other party can be delayed by a necessary time when the preparation for reception is not ready. Thus, accurate picture transmission can be achieved.

In order to achieve the above second object, the present invention is characterized in that in sending specific standardized still picture data, the still picture data is directly transmitted and received without handshaking.

Accordingly, in the present invention, during talking, a predetermined still picture data is directly put into data communication by omitting the handshaking to be performed beforehand. As a result, the communication time for the still data, that is, the interruption time of the talking becomes minimum, and it becomes possible to most effectively utilize the still picture picturephone communication.

In order to achieve the above third object, a still picture picturephone communication system in accordance with the invention is characterized in that picture data after being modulated to a picture data signal can be transmitted to the called party through a telephone circuit at a suitable timing during talking, and a picture signal transmitted from the called party through the telephone circuit is demodulated to picture data and is displayed on a monitor TV. Furthermore, character data including character information and the like is inputted by input means, and the character data is modulated to a bit signal In this case, however, the bit signal is formed with a signal selected from the picture signal.

Accordingly, during talking, an image obtained by a TV camera is modulated to a picture data signal and is transmitted. Furthermore, the picture data signal received from the called party is demodulated to picture data and is displayed on a monitor TV.

In the apparatus, it is also possible to transmit and receive character data. Specifically, the character data is modulated to a suitable signal selected from the picture data signal, and it is transmitted as a bit signal. Accordingly, the character data can be modulated by the same modulating means as the picture data, and thus, the overall arrangement is made to be very simple, and reliable transmission and reception of the character data can be achieved.

In order to achieve the above fourth object, in the still picture picturephone communication system in accordance with the invention, when a call signal is sent from a picturephone set of the other party, a picturephone set of the receiving party responds automatically and connects a circuit. At the same time, when a polling code is sent from the picturephone set of the other party, the picturephone set of the receiving party ascertains this polling code, and thereafter automatically modulates and transmits picture data obtained by its own TV camera.

Accordingly, when a call signal is supplied from the picturephone set of the other party, the called picturephone set responds automatically and connects the circuit between both the picturephone sets. In this condition, when a polling code is supplied, the called picturephone set, after ascertaining and recognizing the polling code, automatically modulates and outputs picture data obtained by its own TV camera.

In this manner, it is possible to manipulate the picturephone set of the other party to make the picturephone set send pictures in accordance with a request of the picturephone set of the first party.

In order to achieve the above fifth object, a still picture picturephone communication system according to the present invention is characterized in that a picture of a calling party is picked up by a TV camera, picture data of the calling party's own picture is stored in an image memory for the calling party, and picture data from the called party is stored in an image memory for the called party. Further, in displaying the pictures, the picture of the calling party is displayed in a mirrored condition reversed with respect to right and left of the picture, and the picture of the called party is displayed as it is in a non-mirrored condition. In addition, in transmitting the picture data, independent of whether the picture of the calling party is selected or the picture of the called party is selected by a selection button, the picture data of the selected picture is transmitted in a non-mirrored condition to the called party.

On the display, since the picture of the calling party is displayed in a mirrored condition in which right and left of the picture is reversed, and since the picture of the called party is displayed as it is in a non-mirrored condition, the display with no unnaturalness or odd feelings can be obtained. Furthermore, the picture of the calling party is transmitted to the called party in the non-mirrored condition, and hence the picture of the calling party is displayed normally on the display of the called party. Moreover, since the picture data stored in the image memory for the called party can be transmitted to a third party by the instruction from the selection button, it is possible to transfer the picture transmitted from the called party.

BRIEF DESCRIPTION OF THE DRAWINGS

FIG. 4 is a waveform diagram of a prior art showing correspondence between picture data and signal at the time of modulation.

FIG. 9 is a block circuit diagram of a still picture picturephone apparatus in which the communication system of the invention is used.

DETAILED DESCRIPTION OF THE PREFERRED EMBODIMENTS

A first embodiment of a still picture picturephone communication system according to the invention will be described with reference to the drawings.

Figure 5:
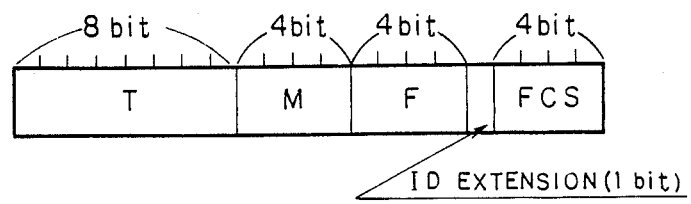
FIG. 5 is a diagram showing an arrangement of an ID code in a first embodiment of a still picture picturephone communication system according to the invention.

FIG. 5 is a diagram of an arrangement of an ID code used at the time of handshaking in the system of the present invention. As shown in the Figure, in the embodiment, response waiting time data (T) is formed in the first 8 bits which have been vacant data in the prior art at the time of handshaking.

In this case, in order to retain the interchangeability with the types of the prior art equipment described above, the response waiting time data (T) is set to represent 1 (one) second when the 8 bits are "00000000".

Figure 6:
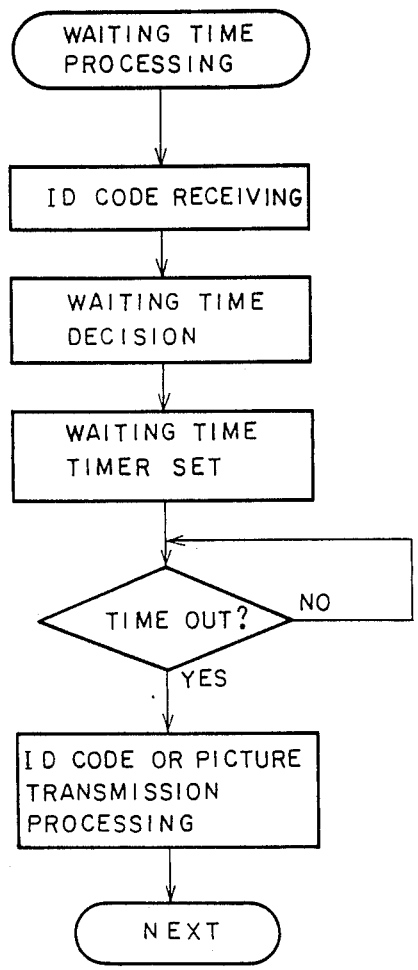
FIG. 6 is a flowchart of a waiting time processing in the embodiment of FIG. 5.

Next, the processing of the waiting time will be described with reference to FIG. 6.

First, at the time of handshaking, the ID code of the called party (the other party) is received, and reads response waiting time data (T).

A waiting time is decided from the reading of the response waiting time data (T), and the counting of the waiting time is started.

After the waiting time elapses, a response processing corresponding to sending out of an ID code or image data is performed.

Accordingly, a sequence diagram showing the picture transmission procedure in the still picture picturephone set in the first embodiment is as shown in FIG. 7.

Figure 7A:
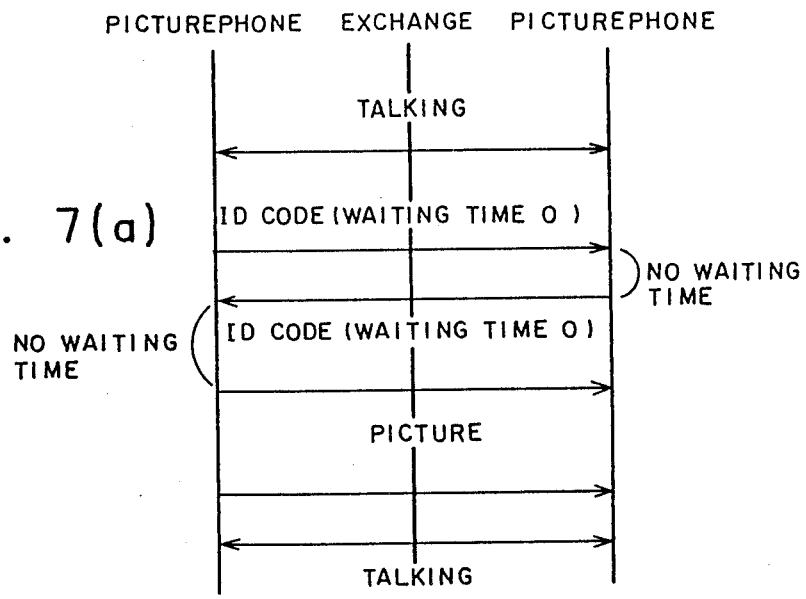
FIGS. 7a and 7b diagrams showing a picture transmission procedure in a still picture picturephone set according to the embodiment of FIG. 5.
Figure 7B:
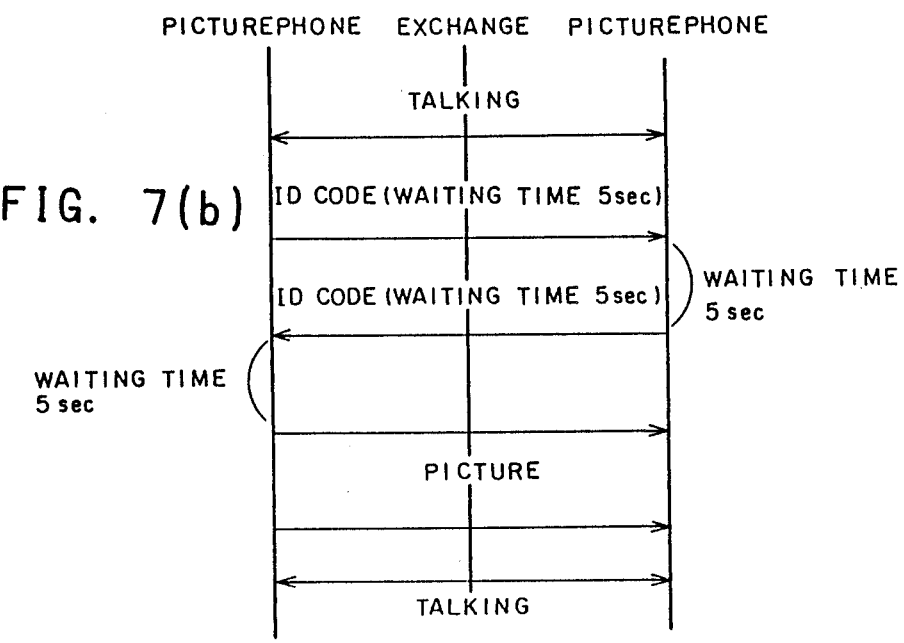

FIG. 7(a) shows a case wherein the response waiting time data (T) in both picturephone sets is T=0, and FIG. 7(b) shows a case wherein the response waiting time data (T) in both picturephone sets is T=5.

Thus, in the first embodiment, since the response waiting data (T) is formed in the first 8 bits which have been vacant data in the prior art at the time of handshaking, the advantage is provided in that the designation and setting of the response waiting time can be made in the same specification as the ID code in the prior art.

Furthermore, in the embodiment, the response waiting time data (T) is set to be 1 second when it is "00000000" so as to perform the response processing delayed by 1 second when the ID code is received by the equipment of the prior art types. Hence the interchangeability with the prior art equipment is provided.

As described in the foregoing, in a still picture picturephone communication system according to the invention, a desired response waiting time is set in an ID code used at the time of handshaking, and the subsequent response processing is delayed by a period of time corresponding to a response waiting time which is received. Therefore, the advantage is provided in that the response waiting time can be controlled to a required response time.

Next, a second embodiment of a still picture picturephone communication system according to the invention will be described with reference to the drawings.

In FIG. 9, there is shown a schematic arrangement of either one of the sending and receiving ends of a still picture picturephone apparatus to which the present invention is applied.

In the Figure, a handset 1, a microphone 2, and a speaker 8 are connected to a voice input/output circuit 3, and the input and output of voice during talking is controlled. The voice signal is sent through an analog circuit 4, a matrix switch 5, and telephone interface circuit 6 to a telephone circuit connection terminal 7. Similarly, a voice signal from a called party is sent through a reverse route of the above signal route to a handset 1 or a speaker 8, and it is reproduced by the handset 1 or speaker 8.

On the other hand, in the case of communication of still picture data, when the sending of the picture is instructed by a key pad 9, a CPU 11 detects this through an input/output port 10, and the picture data is sent to a modulator and demodulator (MODEM) circuit 13 in accordance with a program stored in a program memory 12 beforehand. After modulation of this picture data, it is sent out through the matrix switch 5, and from the telephone circuit connection terminal 7 to the telephone circuit.

The picture data from the called party is sent through a reverse route of the above signal route, and the CPU 11 performs ascertaining of a sent back ID code and other procedures. The picture data is converted to an electrical signal by a TV camera 14, and this picture signal is quantized by a picture controller 15. The quantized picture signal is stored in a picture memory 16 and is sequentially led out for display on a display 17, and also the quantized picture signal is outputted to the telephone circuit connection terminal 7 in accordance with a command from the CPU 11.

Furthermore, when picture data is inputted from the called party, the matrix switch 5 changes over the destination of a received signal through the telephone interface circuit 6 in accordance with a received carrier signal such that the analog circuit 4 is changed to the modulator and demodulator circuit 13. After the received signal has been demodulated in the modulator and demodulator circuit 13, the CPU 11 stores the data in the picture memory 16, and the picture controller 15 sequentially picks up the picture data of the calling party and the picture data of the called party for display on the display 17.

When the transmission and reception of the picture has been finished and no carrier signal is supplied from the modulator and demodulator circuit 13, the matrix switch 5 connects the telephone interface circuit 6 to the analog circuit 4 thereby to restore the talking with voice.

In the apparatus in this embodiment, the key pad 9 includes a transmission switch 18 and a simple procedure switch 19, and normal communication including handshaking is performed by the transmission switch 18, and the communication without handshaking which is the characteristic feature of the invention is performed by on operation of the simple procedure switch 19.

Figure 2:
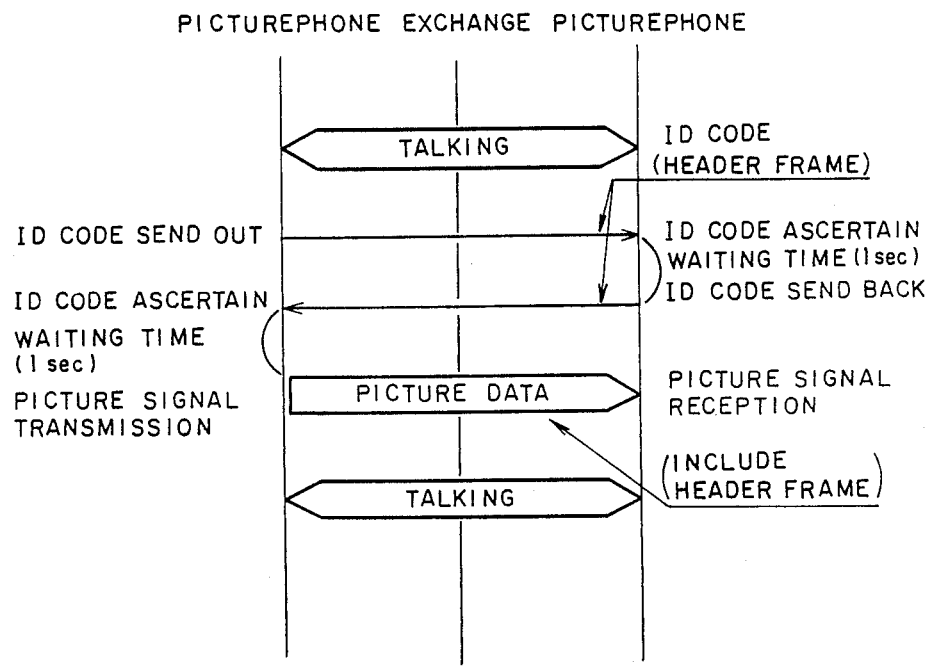
FIG. 2 is a sequence diagram of a prior art showing a picture transmission procedure of the still picture picturephone.
Figure 3A:
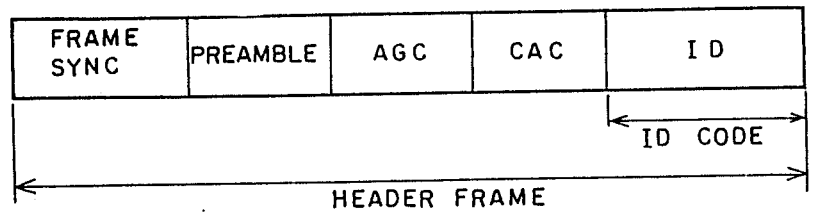
FIGS. 3a-3c are diagrams showing an arrangement of an ID code according to the embodiment of a prior art still picture picturephone communication system.
Figure 3B:
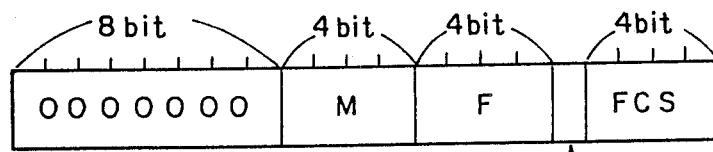
Figure 3C:
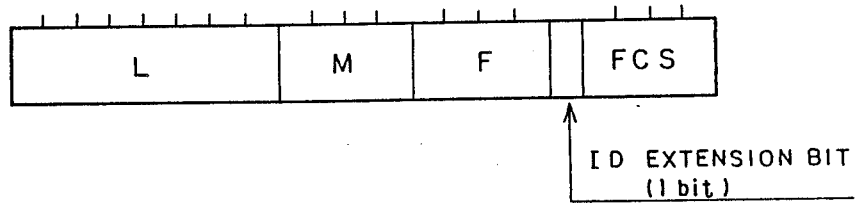
Figure 8:
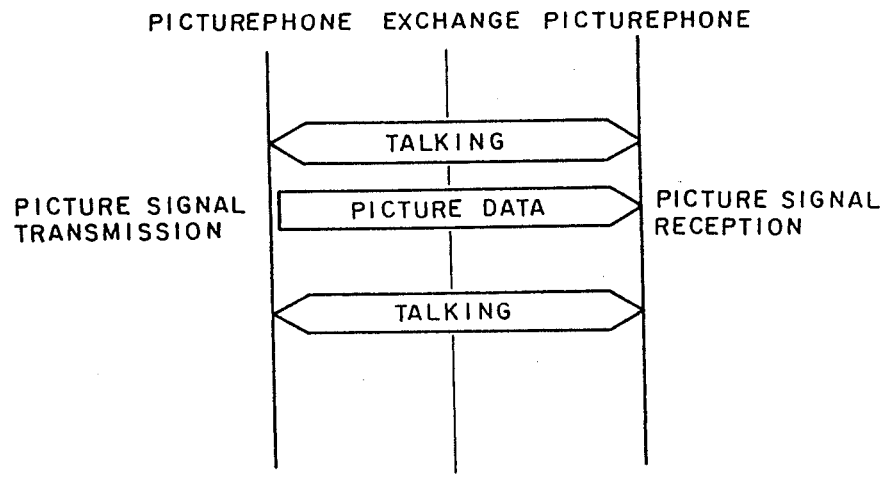
FIG. 8 is a schematic diagram for explaining an overall arrangement of a communication system according to a second embodiment of the invention.

In FIG. 8, the outline of the communication system according to the invention is shown, and in contrast to the prior art system of FIG. 2, the sending out of the picture data using the telephone circuit during talking is executed without performing the handshaking.

As a result, in the present invention, the interruption of talking due to the transmission of the picture data during talking can be reduced remarkably.

Figure 10:
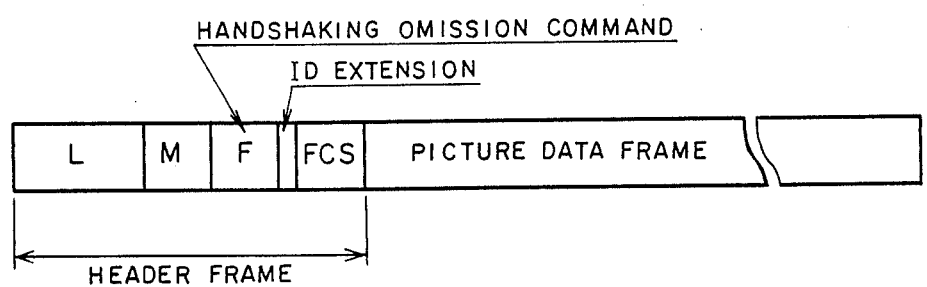
FIG. 10 is a diagram for explaining picture data preferable in the invention.
Figure 12:
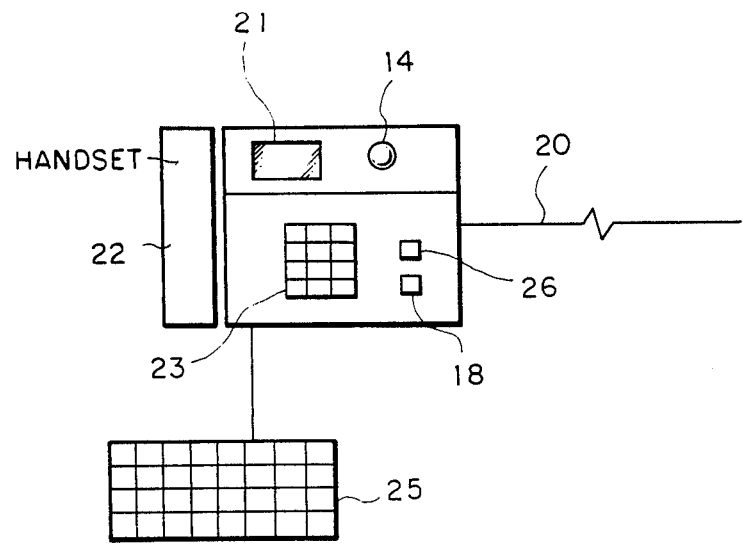
FIG. 12 is a schematic front view of a still picture picturephone apparatus showing a third embodiment of the invention.

FIG. 10 shows an example of picture data in a preferred form in the present invention. This picture data consists of a picture data frame of a serial signal formed by electrical picture data for one picture plane taken in from the TV camera 14 in FIG. 9, and a header frame placed at the beginning of the picture data. In the embodiment, the picture data of FIG. 8 is transmitted as data including the header frame and the picture data frame connected to each other as shown in FIG. 10. At the receiving side, the preparation for producing a picture is carried out in accordance with the header frame sent preceding the other data.

The header frame includes, as shown in FIG. 10, data quantity command L of the sent-out image data, pixel capability M of the pixels transmitted, frame information F including handshake omission command if necessary, ID extension command, and error check bit FCS. This header frame is generally similar to the header information including the ID command for ascertaining the sending and receiving parties when the handshaking is performed in usual situations. However, as described in the foregoing, the distinctive feature of the header frame in this embodiment is that the signal F containing the handshaking omission command is included in the header frame.

Of course, in the present invention, any command within the header frame may be used as the handshaking omission command. However, practically, it is preferable to include the bit command indicative of the omission of the handshaking within the picture data frame preceding to the header frame.

Furthermore, in the present invention, the handshaking command within the header frame may not necessarily be added. In this case, the header frame and the picture data frame can be used directly for image processing at the receiving side.

Figure 11:
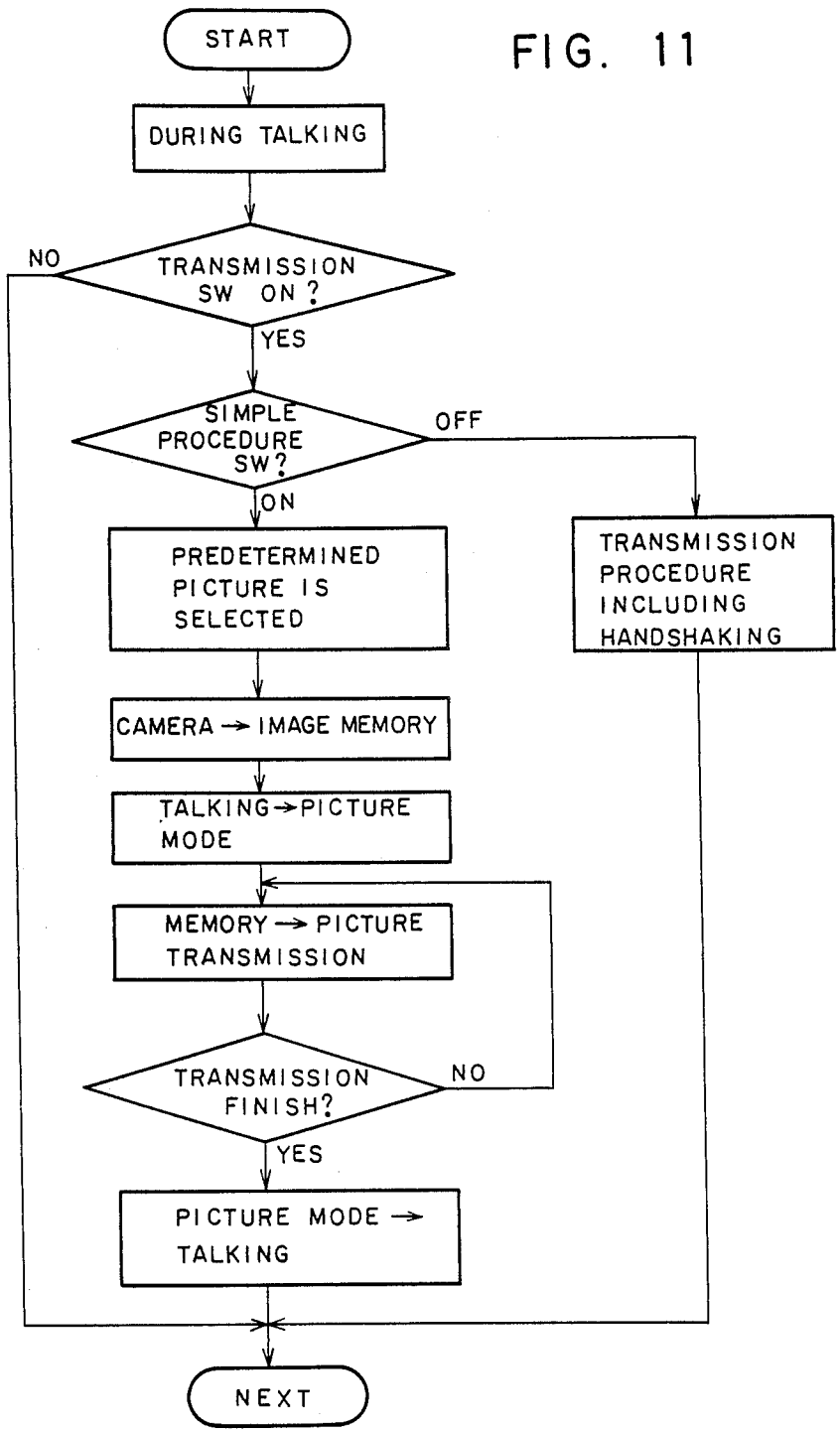
FIG. 11 is a flowchart showing the communication system of the invention.

FIG. 11 shows a flow chart of the operation of the communication system according to the invention. The operation whether to perform the handshaking or not is carried out by the simple procedure switch 19 provided in the key pad 9 shown in FIG. 9, and the picture transmission during talking is controlled by the change over of the transmission switch 18.

In FIG. 11, the telephone circuit is normally in a talking condition, and during such talking, the change over of the transmission switch 18 is being monitored. When the transmission of the still picture data is required, the transmission switch 18 is actuated, and in the system in this embodiment, the discrimination is carried out whether this transmission instruction means communication including handshaking or communication omitting the handshaking.

Generally, in order to compare the sending and receiving parties as to the differences in the number of pixels and in the system classifications between the sending party and the receiving party, the handshaking is performed. However, in a specific case, it is possible to omit the handshaking.

In the embodiment, such a handshaking omitting condition is possible, for example, in the transmission mode for pixels of 96×96, and when the pixels of 96×96 are selected at the sending side, the simple procedure switch 19 within the key pad 9 is actuated to turn on, and the handshaking omitting communication is started.

The mode for the pixels of 96×96 is possessed by almost all still picture picturephones usually used. As a result, for the transmission of this specific mode, in almost all cases, the data communication is possible without performing the handshaking. In the present invention, noting this fact, it is the characteristic feature to perform the handshaking omitting communication in a common communication mode which is easily standardized, for example, in the embodiment, for pixels of 96×96.

When the simple procedure switch 19 is in an off condition, the communication including handshaking is performed similar to the normal prior art case as shown in FIG. 2. On the other hand, when the switch 19 is in its on condition, firstly, a predetermined picture is selected as shown in the flow chart of FIG. 11. In the embodiment, this picture indicates the pixels 96×96 mode, and the CPU 11 automatically selects this pixels 96×96 mode.

In this manner, when the preparation at the sending side is completed, the TV camera 14 supplies one picture to the picture memory 16, and at the same time, the CPU 11 performs the change over from the talking mode to the picture mode.

Then, the picture information for one sheet stored in the picture memory 16 is sent out through the picture transmission system described above to the receiving side from the telephone circuit terminal 7. This picture communication is continuously monitored until it is completed, and as soon as the transmission is completed, the talking mode is restored from the picture mode, and returns to the normal talking condition.

As described above, according to the present invention, by the turning on operation of the simple procedure switch, the handshaking is omitted. As a result, the advantage is provided that the transmission of the still picture can be attained within a very short time, and the interruption time of the talking can be shortened.

Furthermore, in the present invention, since such a handshaking omitting mode is carried out in a specific mode, for example, in the embodiment, the pixels 96×96 mode, and since almost all terminal telephone sets can receive this without handshaking, the reliability of data communication and the reduction of communication time can coexist with each other.

Of course, in the present invention, the commonly used mode is not limited to the pixels 96×96, but any specific system classification which is common to the terminal telephone sets can be selected In the embodiment described above, the instruction to omit the handshaking is issued by the simple procedure switch. However, in the present invention, it is possible to provide that when a predetermined specific system classification for omitting the handshaking is selected, the communication in a handshaking omitting mode is automatically performed. Owing to this arrangement, it is possible to eliminate the simple procedure switch, and to simplify the arrangement and manipulation.

As described in the foregoing, in accordance with the present invention, in a specific system classification transmission mode, the handshaking can be omitted, and hence it is possible to reduce the transmission time and the talking interruption time.

Next, a third embodiment of a still picture picturephone communication system according to the invention will be described with reference to the drawings.

Figure 13:
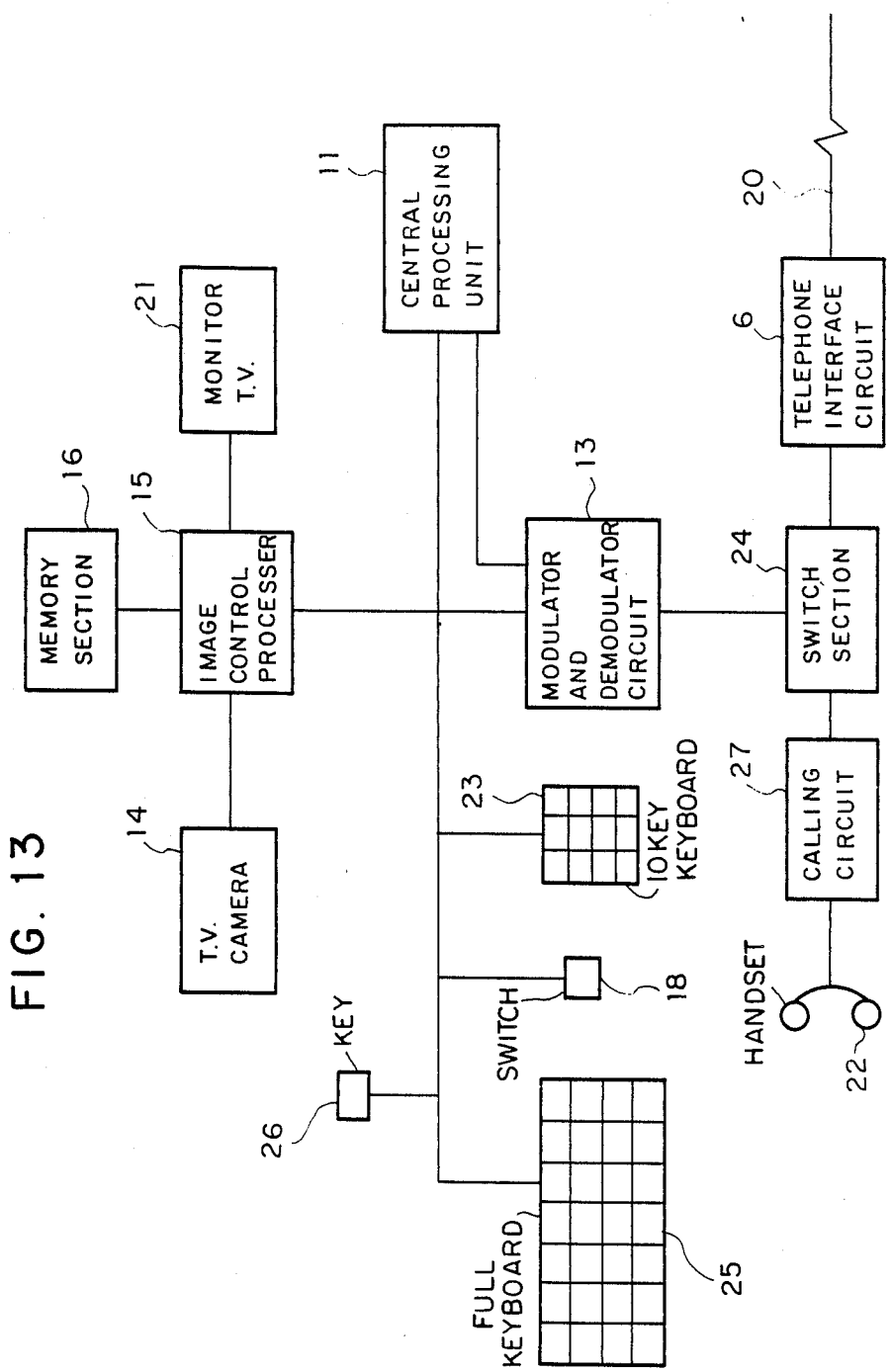
FIG. 13 is a block diagram showing a circuit of the above third embodiment.

In FIG. 13, reference numeral 20 designates a telephone circuit, 21 a monitor TV for displaying a picture of one (calling) party as well as a picture of the other (called) party, 14 a TV camera, 22 a handset for making a telephone call, 23 a ten key keyboard for inputting a selection signal such as dialing, 18 a transmission switch for instructing the called party to send a still picture, 6 a telephone interface circuit for effecting the connection with the circuit, 27 a communication circuit including an amplifier and the like for making a telephone call, 13 a modulation and demodulation (MODEM) circuit to feed still picture data on the telephone circuit, 24 a switch section for switching the signal connection with the circuit between the communication circuit 27 and the modulation and demodulation circuit 13, 16 an image memory section for storing an image picked up by the TV camera as still picture data for transmission and for storing still picture data from the called party, 15 an image control for performing A/D conversion of a video signal from the TV camera 14 to produce static picture data, for performing D/A conversion of a signal from the image memory section 16 to produce a video signal, for producing a sync signal, and for performing writing and reading processing of image storing and the like, and 11 a central processing unit (CPU) constituted by a microcomputer and including a ROM and a RAM, having the function in the prior art example. However, this central processing section 11 has additionally a character generating function In other words, it is capable of converting bit data including "0" and/or "1" to character data such as character information and the like. Reference numeral 26 designates a character sending key for instructing the sending of the character data, and 25 designates a full keyboard for inputting the character data.

Thus, the inputting of the character data such as character information is made through the full keyboard 25, and the sending out of the inputted character data is effected by depressing the character data sending key 26.

Here, the modulation and demodulation of the character data in the central processing section 11 and the modulation and demodulation circuit 13 in this embodiment will be described.

Figure 14A:
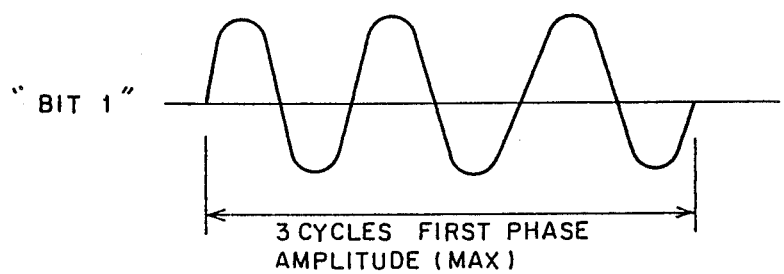
FIG. 14a and 14b are waveform diagrams showing the correspondence between character data and bit signal in the above third embodiment.
Figure 14B:
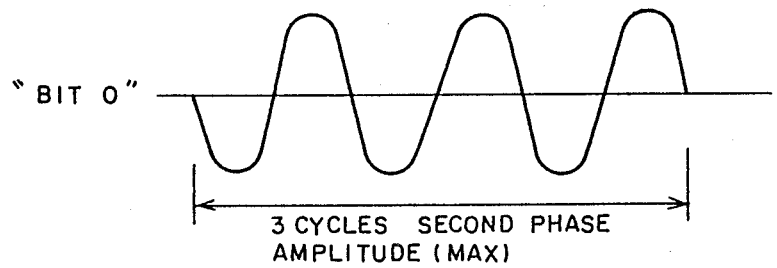

The "1" and "0" in the bit data respectively correspond to signals in FIG. 14, and as shown in FIG. 14(A), 14(B) the "bit 1" corresponds to a set of signals including signals having the maximum amplitude and continuing over three cycles in the first phase, and the "bit 0" corresponds to a set of signals including signals having the maximum amplitude and continuing over three cycles in the second phase.

Figure 15:
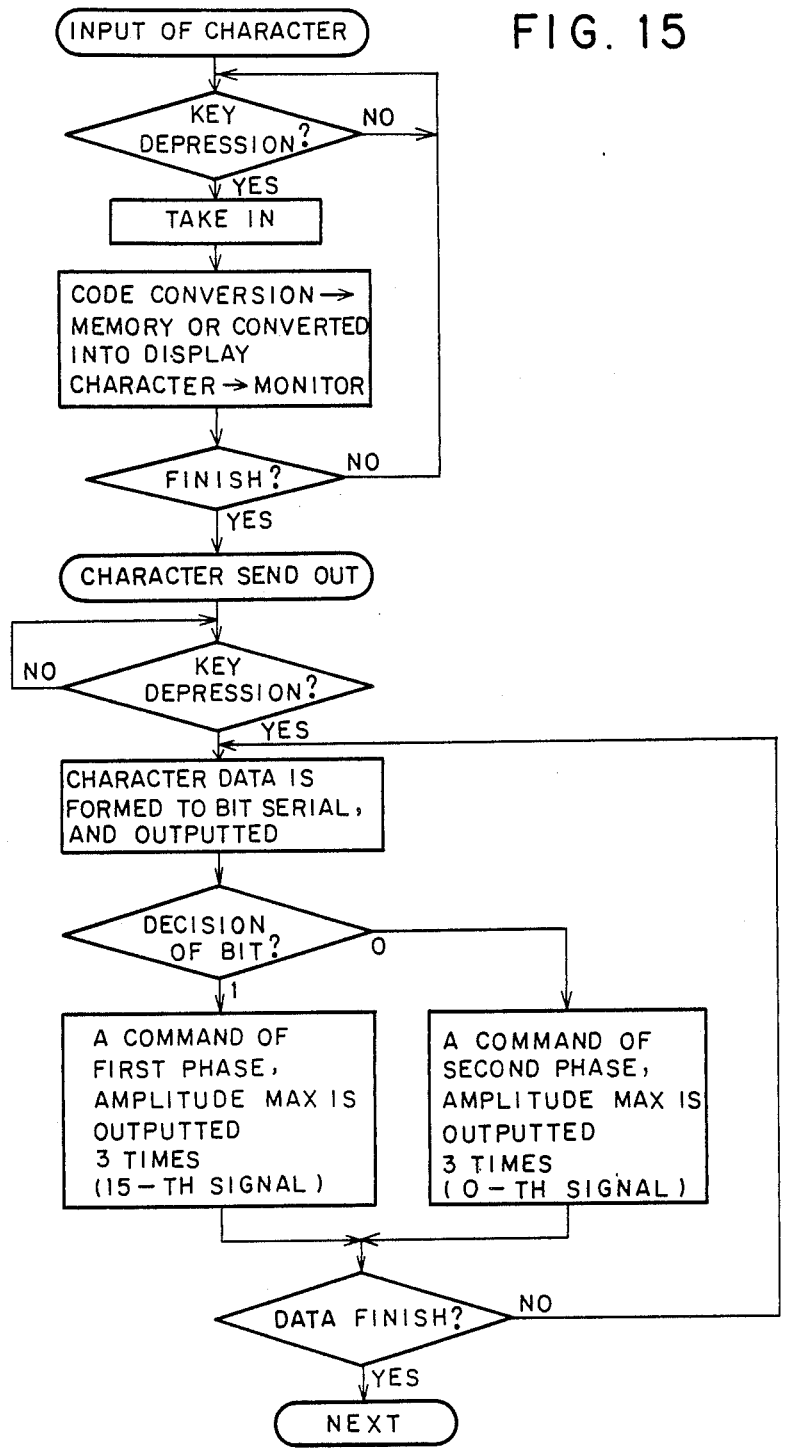
FIG. 15 is a flowchart showing a procedure in transmitting the character data.

In the central processing section 11, in accordance with the flowchart in FIG. 15, the correspondence between the bit data and the bit signal is established, and this bit signal is outputted from the modulation and demodulation circuit 13.

When a character such as character information and the like is to be inputted from the full keyboard 25, the full keyboard 25 is put in the operable condition. In this case, this actuation of the full keyboard 25 may be linked with the taking up of the handset 22, or a switch may be provided separately. When a key of the full keyboard 25 is depressed, a code corresponding to the key is supplied to the central processing section 11. The central processing section 11 stores this code in a memory built therein, and at the same time, converts the code to, for example, a display character which is a character for display on the screen of the monitor TV 21.

This input operation is repeated, and when the input operation is finished, the character sending key 26 is depressed. The central processing section 11 converts the inputted character data (in this case, character data) into bit data. For example, one character is converted to serial data of four bits. The central processing section 11 issues a command to the modulation and demodulation circuit 13 to establish the correspondence between the bit data including "0" and/or "1" and the bit signal as described in the foregoing, and the modulation and demodulation circuit 13 outputs the bit signal. In other words, if the bit data is "1", a 15-th signal in FIG. 14 (in the case of a picture signal, a signal representing "white") is outputted, and if the bit data is "0", a 0-th signal in FIG. 14 (in the picture signal, a signal representing "black") is outputted. This operation is repeated sequentially for the inputted character data, and the bit signal corresponding to the character data is outputted. This bit signal is transmitted to the called party through the telephone circuit 20 as is the case in the transmission of the picture signal. When the character data is transmitted to the called party, it goes without saying that the ID code sending before the character data must include an identification signal indicating the transmission of a bit signal.

Figure 16:
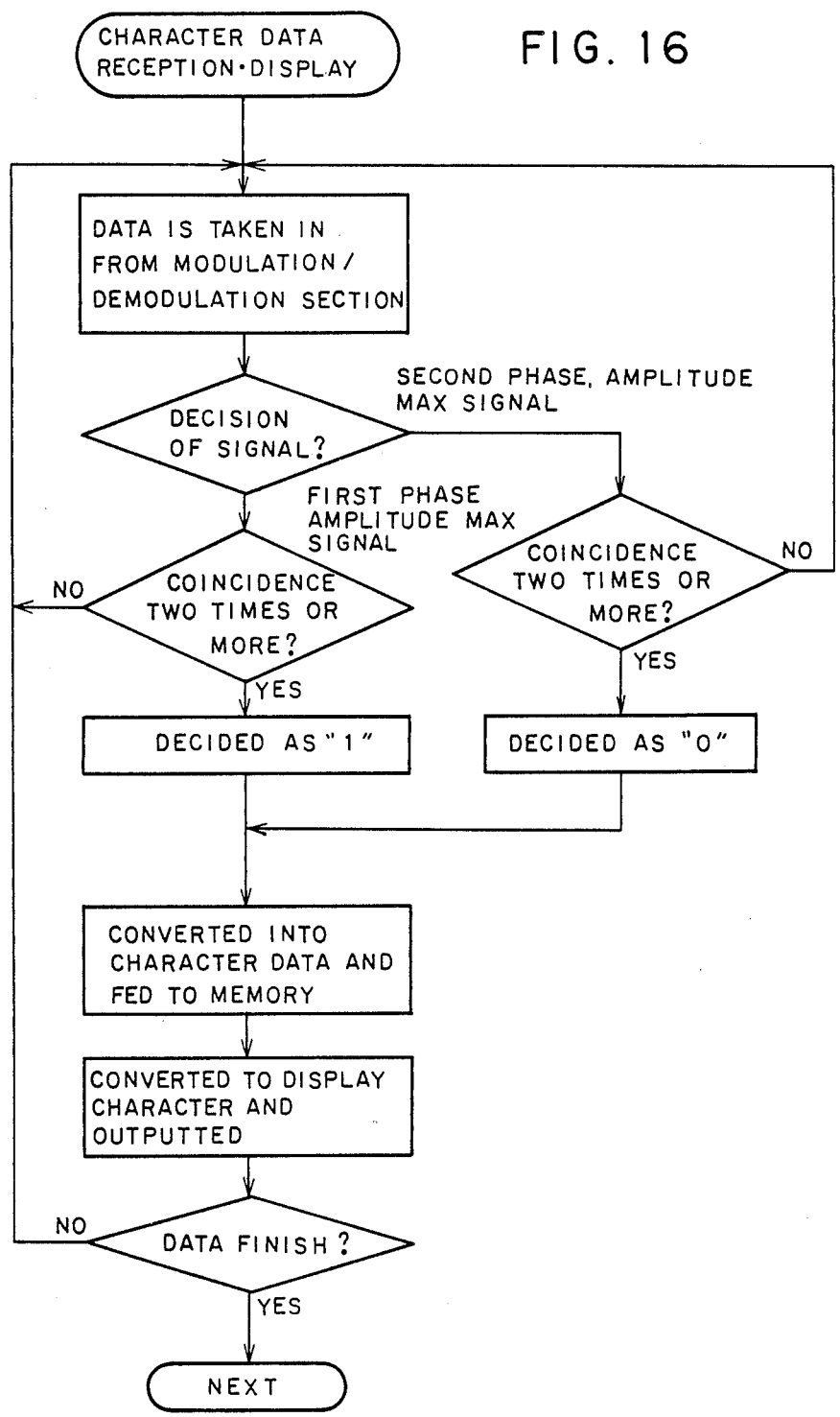
FIG. 16 is a flowchart showing a procedure in receiving the character data.

Next, the operation following to the reception of a signal relating to character data, that is, a bit signal after identifying the ID code will be described with reference to FIG. 16.

A bit signal received over the telephone circuit 20 is demodulated in the modulation and demodulation circuit 13, and it is taken in the central processing section 11 as data. The central processing section 11 decides whether the signal is a signal of the maximum amplitude in the first phase (a 15-th signal) or a signal of the maximum amplitude in the second phase (a 0-th signal), and when two or more sets of three predetermined signals are included, it is decided that the bit data is "1" or "0".

Then, the central processing section 11 converts the bit data to character data to store the character data in the memory built therein, and at the same time, it is outputted to the monitor TV 21 for display.

As described in the foregoing, in the still picture picturephone apparatus in this embodiment, the bit data as shown in FIG. 14 is made to correspond to the picture signal as shown in FIG. 4. As a result, the mechanism for signal transmission and reception can be utilized, and the overall arrangement can be made simple. Moreover, since the signal of the maximum amplitude is used, the accuracy of decision as to the signal is high. Furthermore, the bit signal is transmitted as shown in FIG. 14 as a set of three consecutive signals, and at the receiving side, the decision is accomplished when two out of the three signals can be ascertained. Therefore, even when one of the three signals can not be ascertained, it is possible to achieve the accurate decision, and the reliability of signal transmission and reception is very high as a whole.

In the present invention, as described above, since the bit data is made to correspond to a signal selected from the picture signal, the overall arrangement is simple, and yet the effective communication of the bit data can be achieved in the still picture picturephone apparatus.

Next, a fourth embodiment of a still picture picturephone communication system according to the invention will be described with reference to the drawings.

Figure 1:
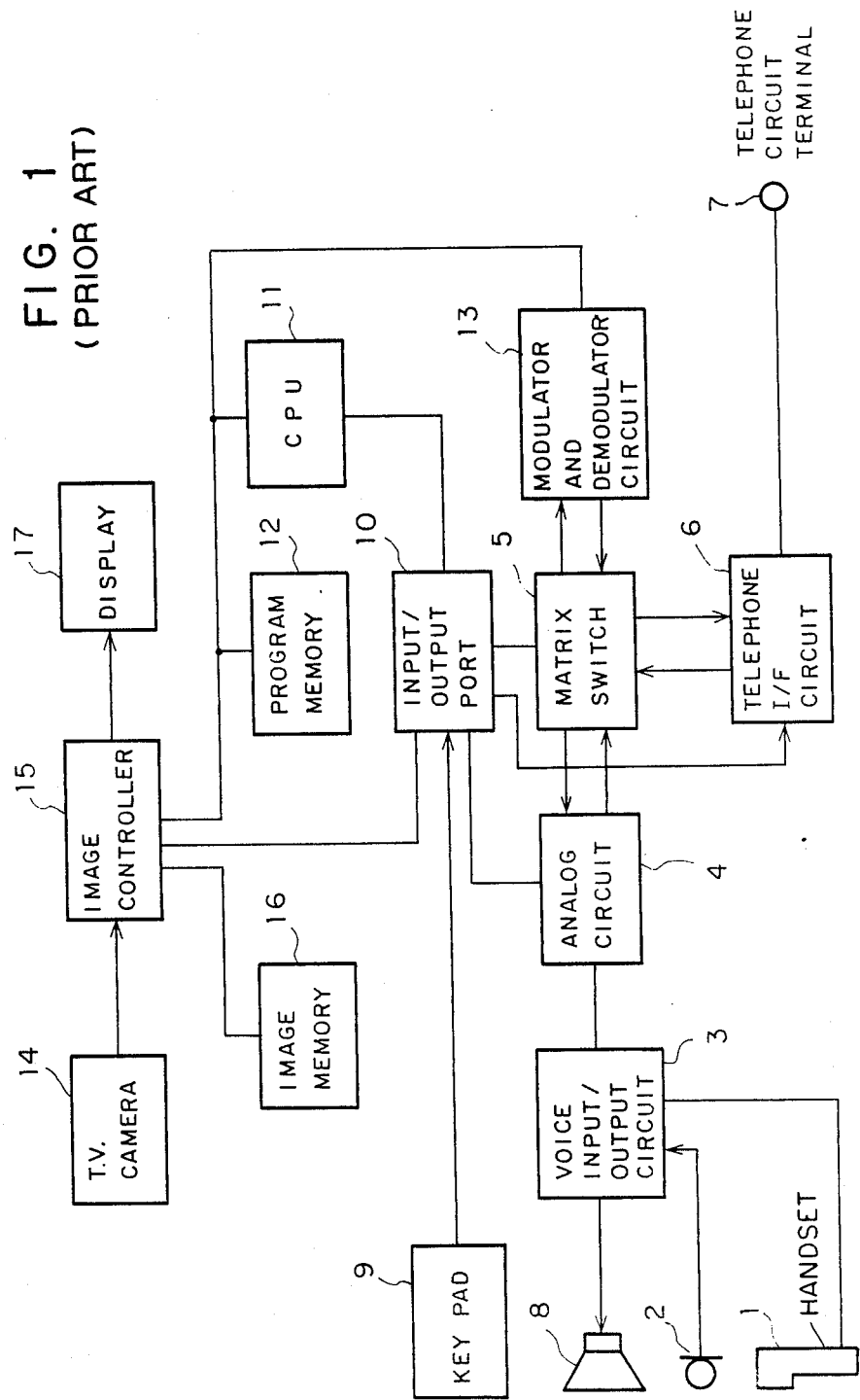
FIG. 1 is a block diagram of a prior art still picture picturephone.
Figure 17:
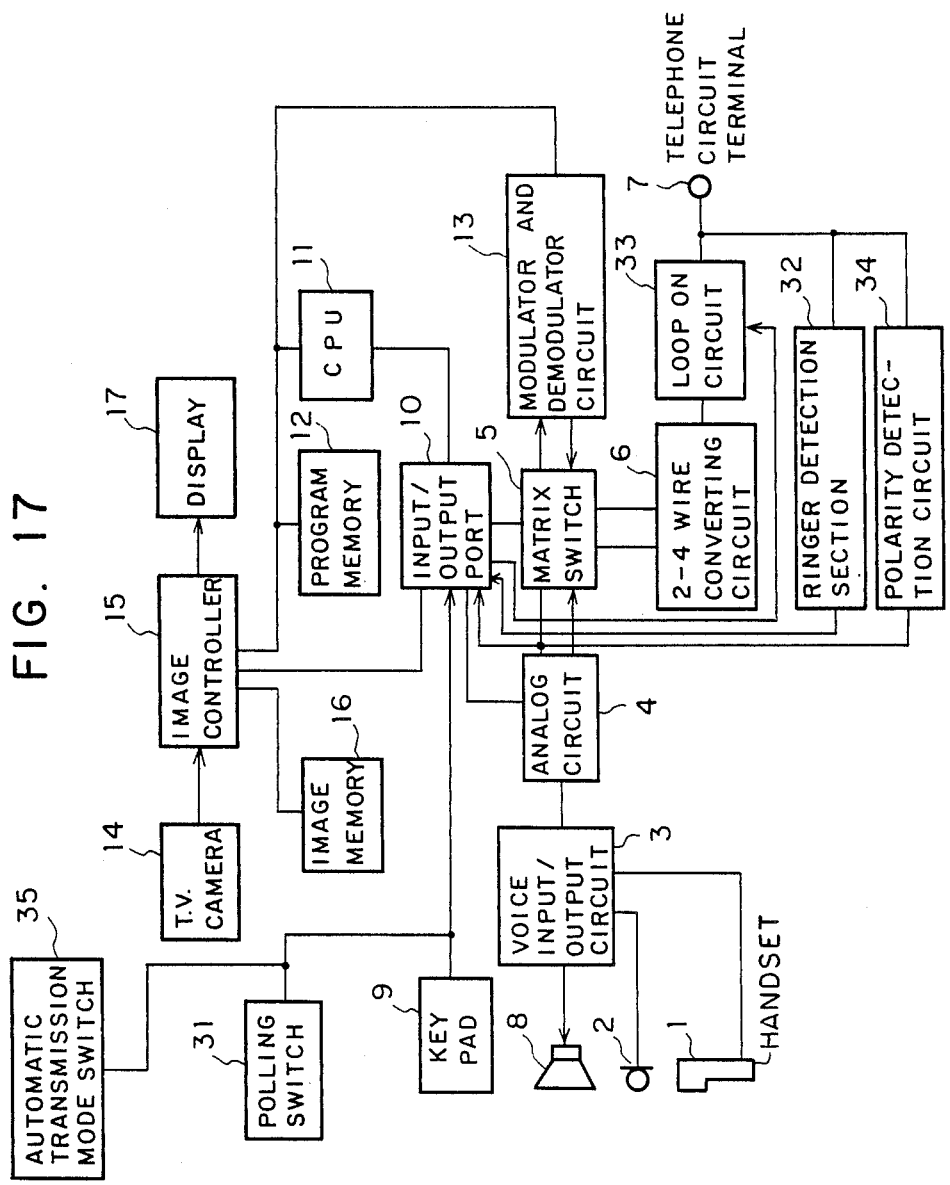
FIG. 17 is an arrangement block diagram of a still picture picturephone set used in a fourth embodiment of the present invention.

In FIG. 17, reference numerals 1~17 designate the same constituent elements as that of the prior art still picture picturephone shown in FIG. 1, and the descriptions thereof are omitted. In this embodiment, as the telephone I/F circuit, a 2–4 wire conversion section 6 is employed.

Reference numeral 31 designates a polling switch, 32 a ringer detection section, 33 a loop on circuit, 34 a polarity detection section, and 35 an automatic transmission mode switch.

Figure 18:
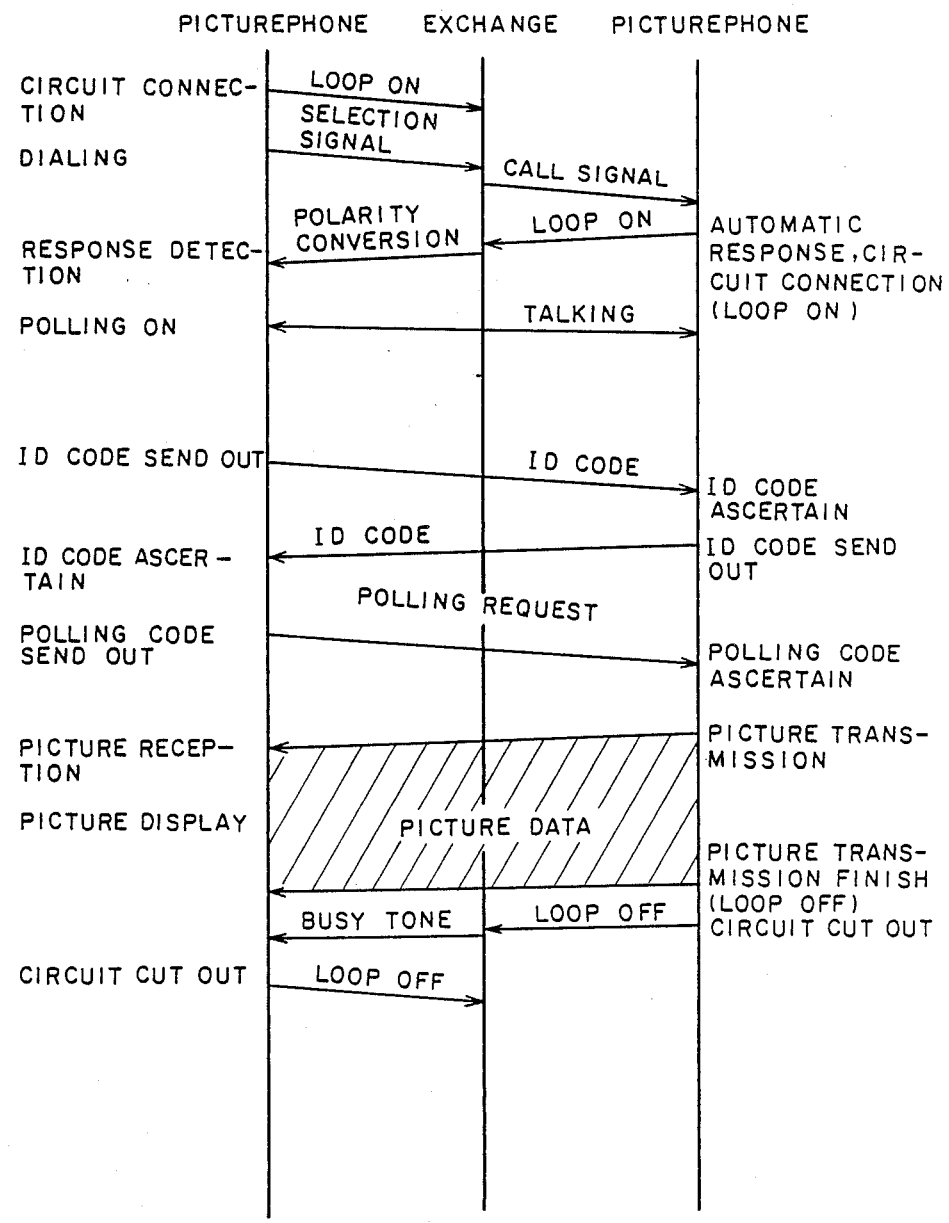
FIG. 18 is a sequence diagram showing the transmission operation in the above fourth embodiment.
Figure 19:
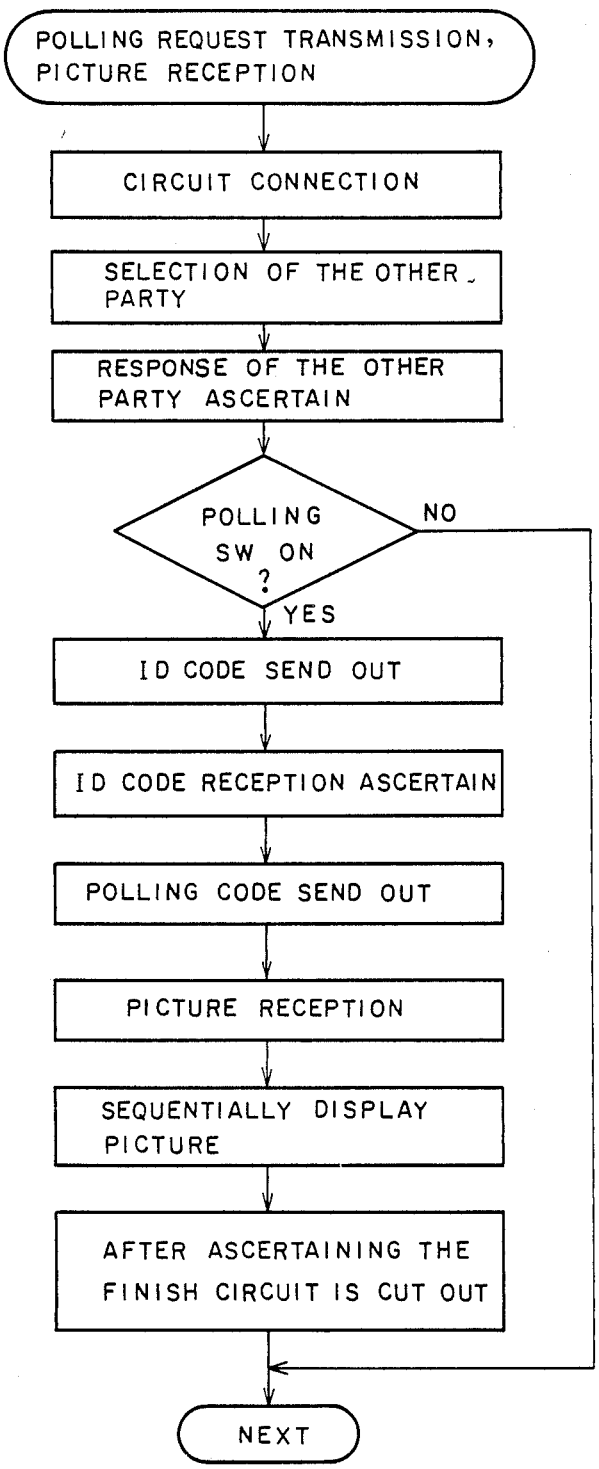
FIG. 19 is a flowchart showing the operation of a polling requesting party in the above fourth embodiment.
Figure 20:
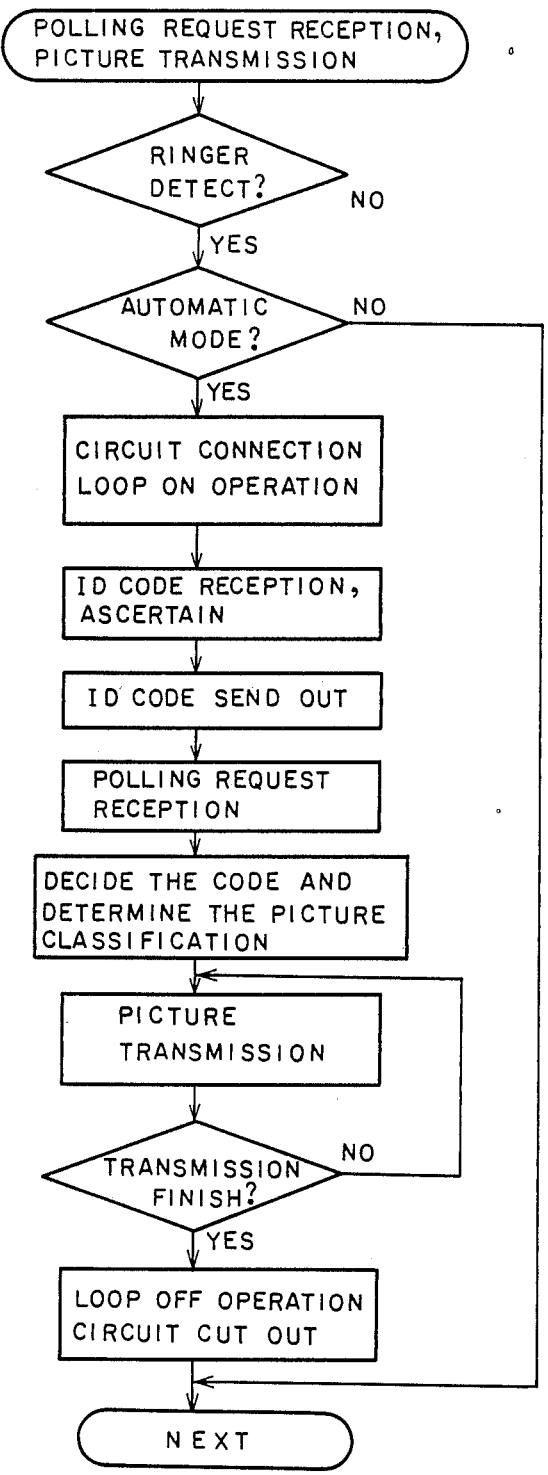
FIG. 20 is a flowchart showing the operation of a responding party in the above fourth embodiment.

The transmission method performed between both still picture picturephone sets in this invention (hereinafter, this transmission method is referred to as polling) will be described with reference to FIGS. 18 to 20. FIG. 18 is a sequence diagram showing a procedure for transmission between two picturephone sets, and FIGS. 19 and 20 are flowcharts showing the operations of a polling requesting party and a responding party respectively. Furthermore, in this embodiment, it is assumed that the two picturephone sets have the same arrangement as shown in FIG. 17.

After requesting a polling, when a handset of the picturephone set of the picture receiving party is taken up, a hook switch (not shown) detects this, and the loop-on circuit 33 is operated. As a result, a circuit between the picturephone set and an exchange is connected (loop on). Then, when a telephone number of the other party is dialed by a ten key (not shown), a selection signal for the other party is transferred to the exchange, and the exchange sends a call signal to the picturephone set of the other party, that is, the picturephone set which transmits the picture in response to the polling request.

In the picturephone set which receives the call signal, the ringer detection section 32 detects this, and it is decided whether an automatic mode is effected, that is, whether the automatic transmission mode switch 35 is turned on. When the automatic mode has not been effected, the circuit is not connected automatically, and the polling is not carried out. When it is in the automatic mode, a loop-on command is supplied to the loop-on circuit 33, and the circuit is connected between the picturephone set and the exchange (loop on). Thus, the exchange inverts the polarity of the circuit leading to the polling requesting party (+ and − of the 2-wire are inverted).

The picturephone set of the polling requesting party detects the inversion of the polarity by the polarity detection section 34, and since the response of the other party has been ascertained, the circuit between both the parties is connected.

When the polling switch 31 of the polling requesting party has been turned on, the picturephone set of the requesting party selects an ID code. Then, the picturephone set of the responding party sends its own ID code after ascertaining the received ID code, and the confirmation of the ID codes is performed by both parties. By such sending and receiving of the ID codes, the capability of the two picturephone sets connected to the circuit is determined, and it is ascertained that picture communication is possible. However, such sending and receiving of the ID codes may be omitted if the capability of the picturephone set of the other party is known beforehand.

Next, a polling code requesting the polling is selected by the picturephone set of the requesting party. The responding party, after ascertaining the polling code received, transmits the picture data obtained by a TV camera 14. In this respect, the TV camera 14 is built in the picturephone set, and it is normally designed to pick up the picture of the talking person. For this reason, it is sometimes impossible to obtain a picture at the time of polling. Thus, in order to obtain the picture at the time of polling, another TV camera may be provided separately. Furthermore, TV cameras 14 may be provided at a plurality of places to monitor these places. In this case, information as to the type of the picture is included in the polling code, and the responding party selects the type of the picture in accordance with this code.

When the transmission of the picture data is completed, the responding party automatically performs the loop-off operation (circuit cut-out), and cuts out the circuit. Then, the exchange sends a busy tone indicative of the circuit cut-out to the requesting party. Thus, by this action the requesting party ascertains the completion, and cuts out the circuit.

In this manner, a predetermined polling can be achieved in which the picture of the responding party can be obtained by the requesting party. In this case, in sending and receiving the picture data, it is preferable to use the form of the data in which as shown in FIG. 4, signals of a plurality of amplitudes are prepared for respective two different phases, and each of the signals is made to correspond to a color on the screen. In the example shown in FIG. 4, sixteen kinds of colors ranging from white to black can be transmitted. Moreover, it is also preferable to employ this modulation system in exchanging the data such as a command for polling request and the like.

Figure 21A:
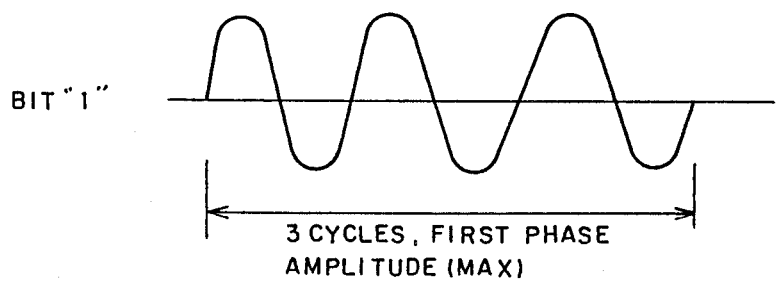
FIGS. 21A and 21B are waveform diagrams showing correspondence between bit data and picture signal.
Figure 21B:
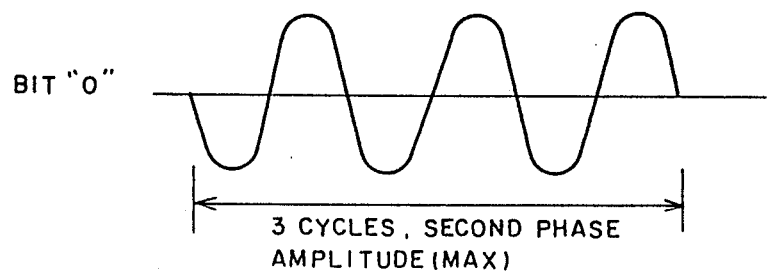

Specifically, as shown in FIG. 21, data is represented by bit signals of "0" and "1", and this bit data is made to correspond to the picture signal of FIG. 4. By employing this form, even a very complex command at the requesting party can be transmitted reliably without fail. Furthermore, in this example, one bit-data is represented by three signals. Thus, at the receiving party, if two signals out of the three signals are identical, it can be decided as being "0" or "1". Accordingly, even when one signal out of the three signals can not be received clearly, the decision can be made accurately and the precision of the communication is improved to a great extent. Furthermore, in this embodiment, since the signal of the maximum amplitude is utilized, the risk of erroneous recognition is very small.

Moreover, according to this system, the communications of the bit data can be achieved accurately, and the transmission of character information and the like can be performed. Also, it is possible to apply this system to the polling of character information stored in the picturephone set of the responding party.

Furthermore, as the object for the polling, the voice obtained from the microphone 2 may be used. In this case, the polling code has contents indicating that the object is voice, and it is only necessary to transmit voice data in a similar operation. When data from a plurality of TV cameras 14 and microphones 2 is sequentially transmitted, such a command may be contained in the polling code in a similar way.

When the transmission system of this invention is utilized, it is possible to monitor a plurality of places sequentially by making a telephone call to picturephone sets installed at a plurality of places and by collecting the pictures therefrom In this case, it is necessary for the picturephone set of the requesting party to conduct polling operations sequentially to a plurality of called persons. For this purpose, an automatic dialing mechanism is provided, and after finishing the dialing, a response from the called person is automatically detected, requiring generation of a signal by depressing the polling switch 18. In this manner, the polling operation is performed automatically As to the circuit cut-out operation upon finishing of the polling, a busy tone caused by the circuit cut-out of the called party and sent from the exchange is detected, and it is only necessary to perform the loop-off operation based on this signal.

As described in the foregoing, in a still picture picturephone communication system in accordance with the present invention, not only the mere transmission of a still picture, but its picture can be transmitted by manipulating a picturephone set of the called party by a request from a picturephone set of one party. As a result, the advantageous effect is provided in that by utilizing the picturephone set, the monitor of a required place can be made at a required time Next, a fifth embodiment of a still picture picturephone communication system according to the invention will be described with reference to the drawings.

Figure 22:
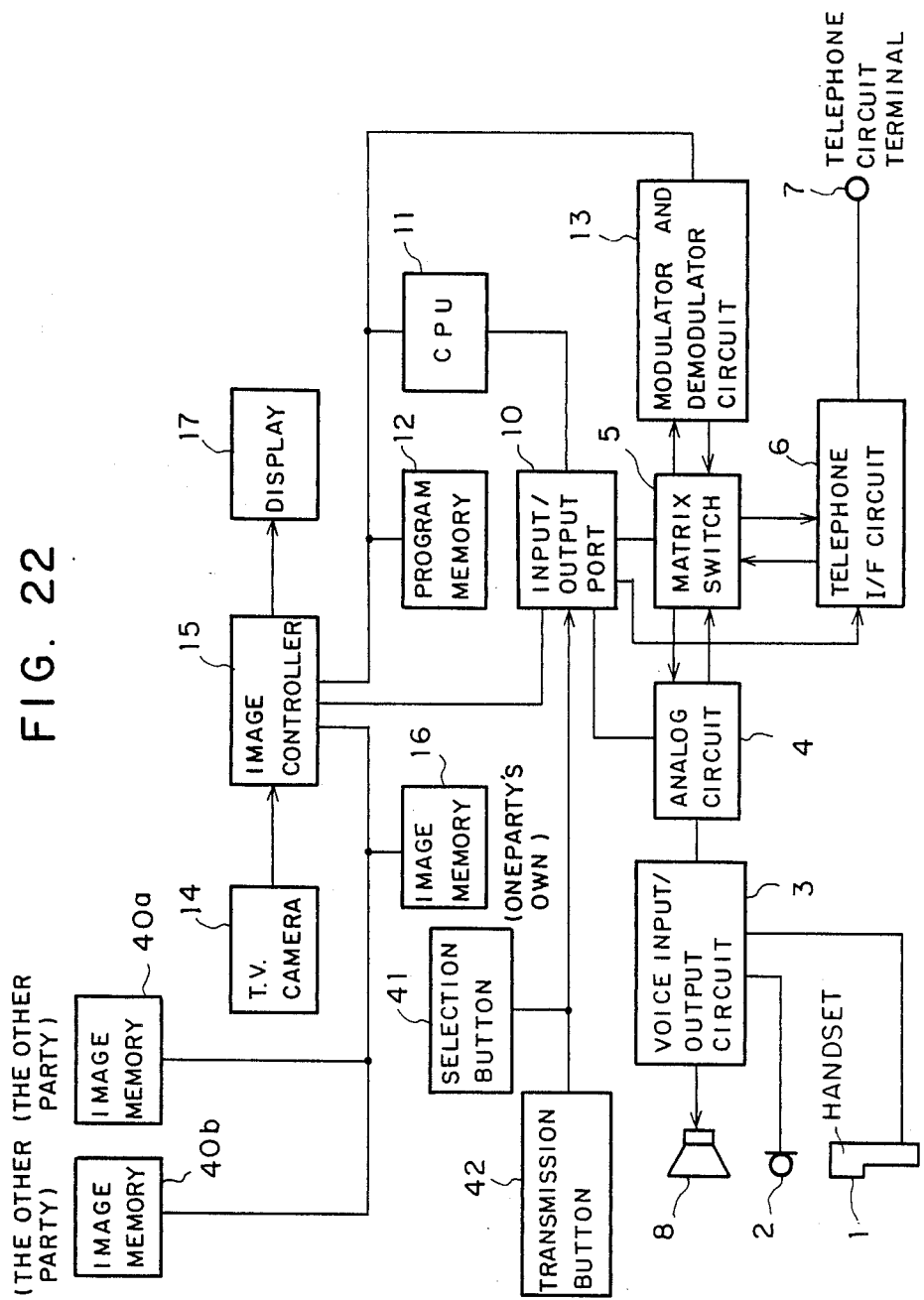
FIG. 22 is a block diagram showing an overall arrangement of a fifth embodiment of a still picture picturephone in accordance with the present invention.

In FIG. 22, reference numerals 1~17 designate the identical constituent elements as that in the prior art example shown in FIG. 1, and the descriptions thereof are omitted.

In this embodiment, the characteristic features reside in that besides an image memory 16 for calling (one) party's own use, image memories 40a and 40b for called (other) parties are provided, and a selection button 41 is provided to select a picture stored in these image memories 16, 40a, and 40b. Furthermore, in this embodiment, although a transmission button 42 is employed in place of the key pad 9, the functions of the transmission button 42 and selection button 41 may be performed by the key pad 9.

Figure 23:
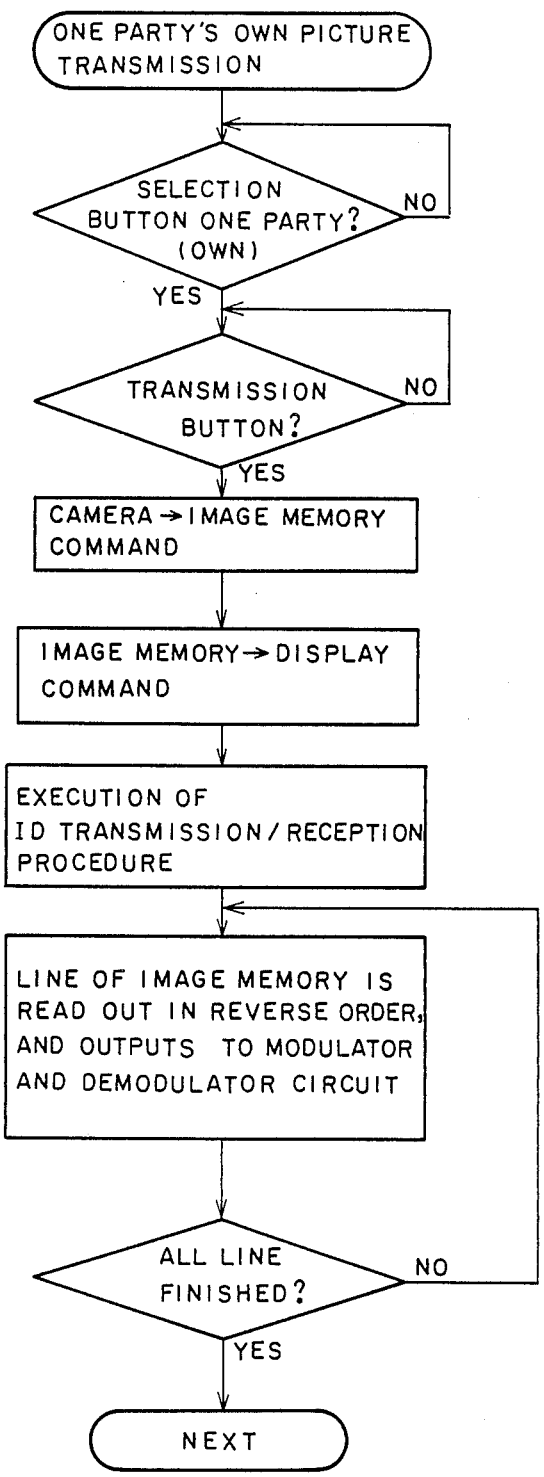
FIG. 23 is a flowchart showing a transmission procedure in the fifth embodiment.

The operation in transmitting a calling party's own picture (own picture) in this embodiment will be described with reference to FIG. 23.

When the calling party's own picture is to be transmitted during talking, firstly, by the selection button 41, the calling party's own picture is selected to be transmitted, and then the transmission button 42 is depressed.

When, the transmission of the calling party's own picture is selected, the CPU 11 writes the picture obtained by the Tv camera 14 in the image memory 16 for the calling party's own picture, and also reads out the picture data stored in the image memory 16 to display on the display 17. In this case, in the embodiment, the picture data obtained by the TV camera 14 is reversed with respect to right and left of the picture by the command of CPU 11, and then written in the image memory 16. As a result, the picture of the calling party displayed on the display 17 is in the mirrored condition in which right and left of the picture are reversed. Thus, the picture having no unnaturalness and odd feelings can be obtained.

Further, after sending out and sending back the ID codes between the calling party and the called party in a similar procedure as in the prior art apparatus, the picture data stored in the image memory 16 is read out in the reverse order, and it is transmitted to the called party through the modulator and demodulator circuit 13. Since the picture data to be transmitted to the called party is read out in the reverse order, the picture is in the non-mirrored condition, and the display at the called party is also in the non-mirrored condition. Accordingly, also at the called party, the picture having no unnaturalness and odd feelings can be obtained.

Figure 24:
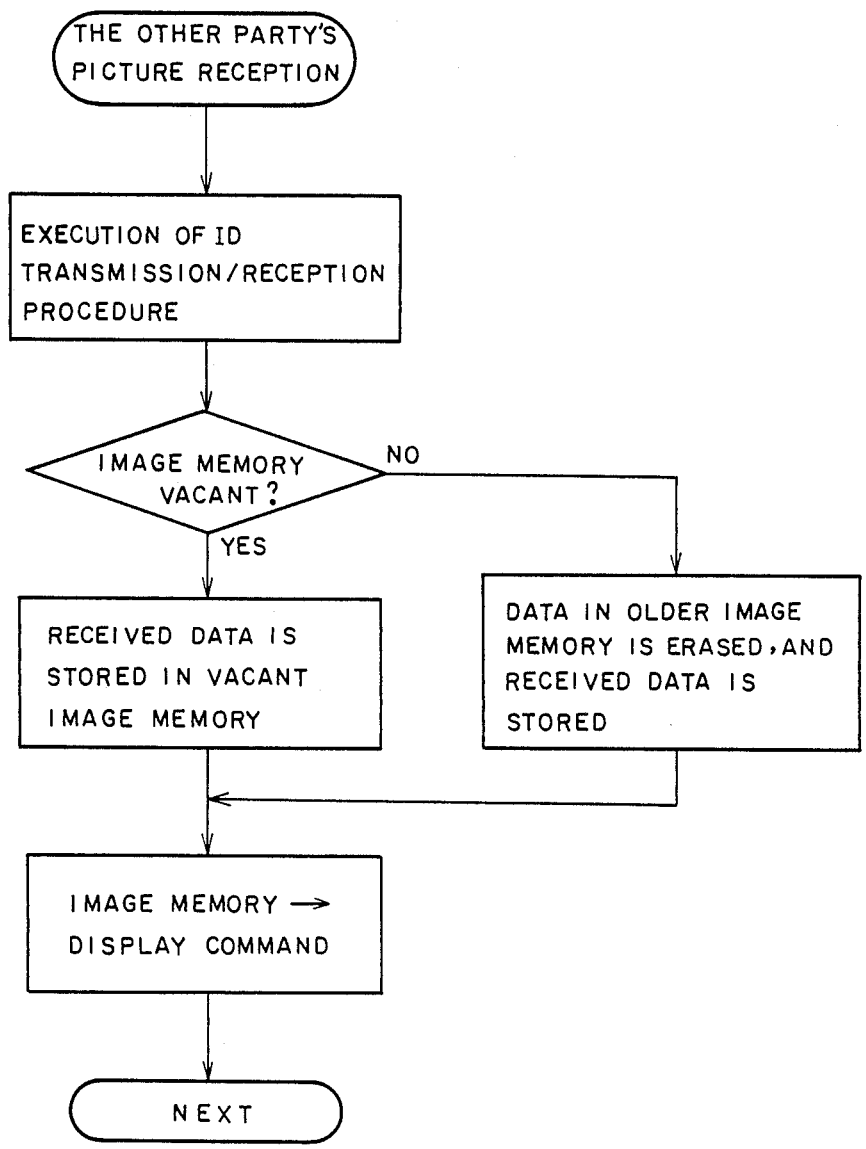
FIG. 24 is a flowchart showing a reception procedure in the fifth embodiment.

Next, the display of a picture sent from the called (other) party will be described with reference FIG. 24.

First, when the ID code is sent from the called party, a response is made in a similar manner as in the prior art apparatus. The image memories 40a and 40b for the called parties are checked whether they are in a vacant condition or not, and if there is an image memory 40 in the vacant condition, the received picture data is written in this image memory 40. If both the image memories are storing picture data, the picture data which is older with respect time is erased, and the received picture data is written here. In this respect, which of the picture data should be erased may be selected in the course of conversation between the talking parties by displaying the reception time of the picture image or the picture per se on the display 17.

The written data is read out and displayed on the display 17. In the case of the picture of the called party, the reversal of the data is not carried out at the time of writing in the image memory 40 or at the time of reading out thereof. Thus, the picture is displayed in the non-mirrored condition. Usually, the picture of the calling party and the picture of the called party are displayed on the display 17 simultaneously respectively on the right and left halves of the screen.

Figure 25:
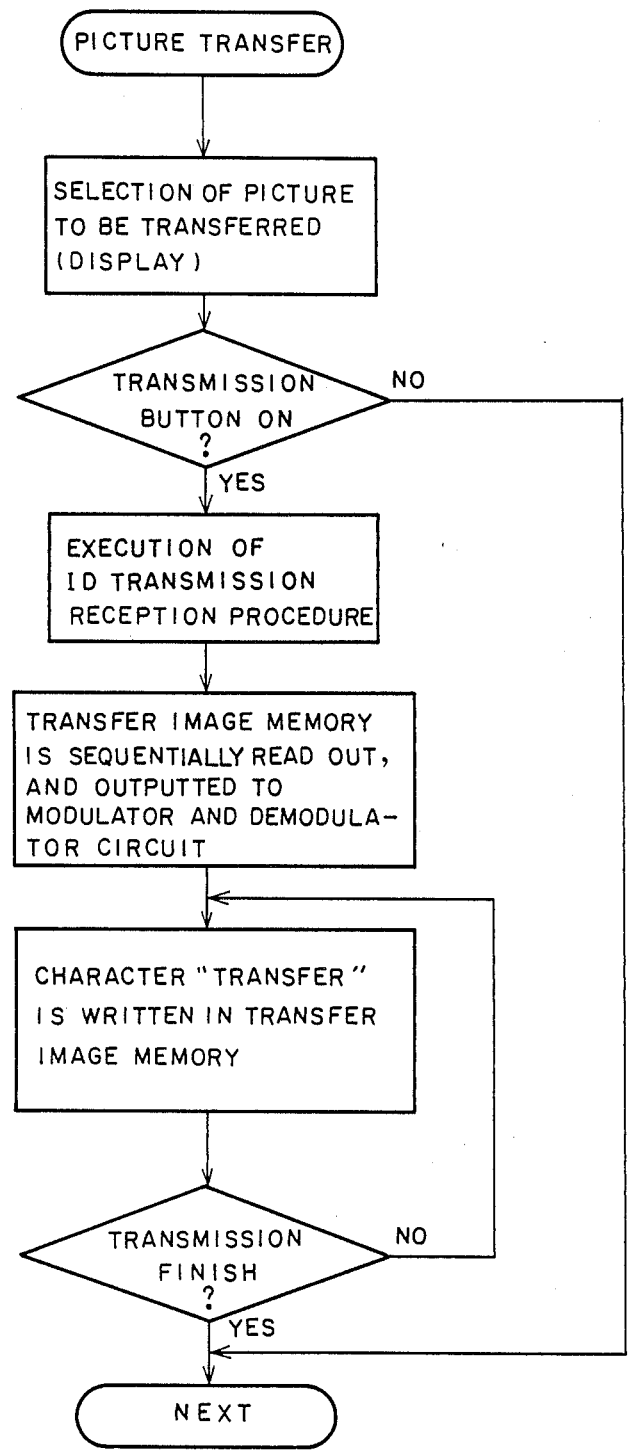
FIG. 25 is a flowchart showing a transfer procedure in the fifth embodiment.

With reference to FIG. 25, the transfer of the received picture of the called (other) party to a third party will be described.

First, when the picture of the called party is selected, the selected picture is displayed on the display 17.

Next, by depressing the transmission button 42, the CPU 11 transmits picture data of the selected picture to the third party. In this case, the character "transfer" is written in the image memory 40 which stores the picture to be transferred. The picture data in which the character "transfer" has been written is sequentially read out and transmitted to the called party through the modulator and demodulator circuit 13.

Figure 26:
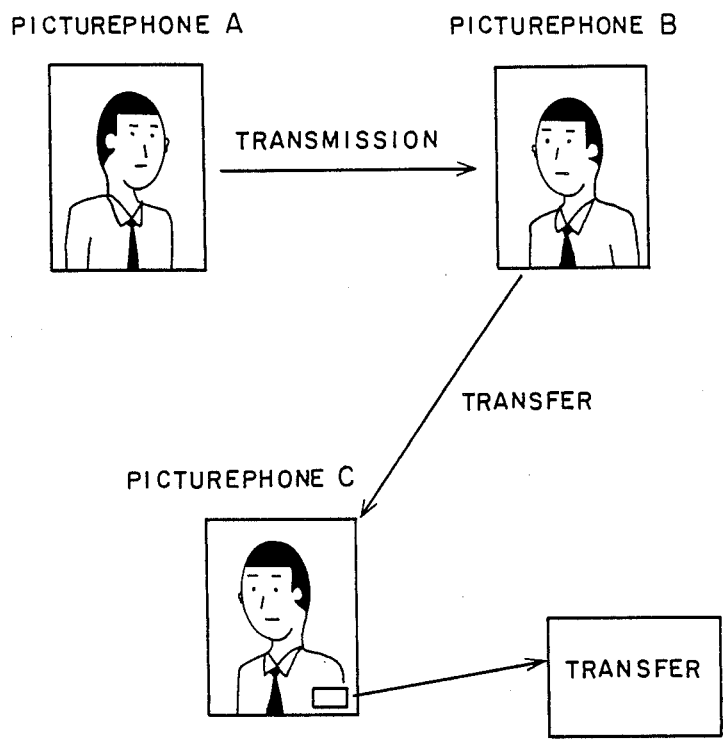
FIG. 26 is a diagram for explaining transferred conditions of a picture in the fifth embodiment.

In place of the character "transfer", a mark may be displayed. When the picture is transferred in this manner, the pictures are displayed as shown in FIG. 26. At a telephone A, the calling party's own picture is displayed on a display 17 in a mirrored condition in which right and left are reversed, and when this picture is transmitted to a telephone B, the picture is displayed on a display 17 of the telephone B in a non-mirrored condition. Further, when the picture is transferred to a telephone C, the picture is displayed on a display 17 of the telephone C in the non-mirrored condition with the character "transfer" inserted in the picture.

As described above, in the embodiment, the picture of the called (other) party sent from the called party is stored in an image memory within the picturephone set as a plurality of pictures, and this picture can be transferred to a third party when necessary. Furthermore, since the transferred picture has an indication automatically displayed thereon representing that this is a transferred picture, the party who received the transferred picture can ascertain that this is a transferred picture.

The image memories for the called parties may be any in number, and also the picture of the calling party may be stored in these memories so as to transfer when necessary.

As described in the foregoing, in the still picture picturephone apparatus according to the present invention, the picture of one (the calling) party is displayed in a mirrored condition, the picture of the other (called) party is displayed in a non-mirrored condition, and further it is possible to transfer the picture sent from the other (called) party to a third party when necessary.

What is claimed is:

1. A method of operating a still picture picturephone communication system for transmitting and receiving a still picture over a telephone circuit including a handshaking process wherein prior to still picture transmission, identification code data indicating a function of picturephone sets and including a divided number of pixels per one frame of a still picture is sent and received, matching of the function of equipment of a calling party with the function of equipment of a called party is achieved, and decision is made as to whether the still picture is being transmitted or not, comprising
   forming desired response waiting time data within said identification code data; and
   in said handshaking process, sending out response data including identification code data or still picture data delayed by a period of time corresponding to said response waiting time data within the identification code data received from the called party.

2. A still picture picturephone and data communication system wherein during a call, picture data obtained by a TV camera is modulated to a picture data signal to transmit the picture data signal to the other party through a telephone circuit, and a picture data signal transmitted from the other party through the telephone circuit is received to demodulate it to picture data and the picture data is displayed on a monitor TV, said system comprising:
   means for inputting bit data which is in the form of digital binary data;
   means for modulating the inputted bit data to a bit signal by establishing and utilizing an identity between each of the logical binary digits "1" and "0" of said bit data and one or more signals selected from said picture data signal; and
   means for transmitting the modulated bit signal to the other party through the telephone circuit.

3. A system according to claim 2, wherein said picture data signal and said bit data signal each include both a modulated component of an amplitude and a modulated component of a phase of a single carrier frequency.

4. A system according to claim 3, wherein said bit signals each respectively corresponds to a different one of two signals of maximum amplitude which are out of phase with each other.

5. A system according to claim 3 or 4, wherein said bit signals each respectively corresponds to a different one of two sets of plurality of successive signals of one type of said picture signal.

6. A still picture picturephone communication system for transmitting and receiving still pictures comprising:
   a first image memory for storing picture data of a picture of one party obtained by a TV camera;
   a second image memory for storing picture data of a picture received from a second party upon being sent therefrom and received by said system;
   a display for displaying the picture of the one party in a mirrored condition reversed with respect to right and left of the picture from the picture data stored in said first image memory, and for displaying the picture of the second party as it is in a non-mirrored condition from the picture data stored in said second image memory;
   a selection button for selecting the picture to be transmitted from either of said first or second image memories; and
   a CPU for reading out the picture data of the picture selected by said selection button from either of said first or second image memories, and for controlling transmission of the selected picture so that the selected picture is transmitted to the second party in the non-mirrored condition independent of whether the selected picture is the picture of the one party or of the second party.

7. A system according to claim 6, wherein said first image memory stores the picture data in a reversed condition with respect to right and left of the picture, and said CPU reads out the stored picture data from said first image memory in the order in which stored when the picture of the one party is to be displayed, and reads out the stored picture data from said first image memory in the reverse order from that in which stored when the picture of the one party is to be transmitted to the second party.

8. A system according to claim 6 or 7, wherein when the picture data of the second party stored in said second image memory is to be transmitted, an indication indicating that the picture is a transferred picture is inserted in the picture.

* * * * *